United States Patent [19]
MacLaren et al.

[11] Patent Number: 6,105,593
[45] Date of Patent: Aug. 22, 2000

[54] FIXED FILM MEDIA CLEANER APPARATUS AND METHOD

[75] Inventors: David S. MacLaren, Mayfield; Daniel Smartt, Geneva; Don Murauskas, Concord Township, all of Ohio

[73] Assignee: Jet, Inc., Cleveland, Ohio

[21] Appl. No.: 09/082,993

[22] Filed: May 22, 1998

[51] Int. Cl.[7] ....................................... B08B 3/02
[52] U.S. Cl. .................. 134/167 R; 134/168 R; 134/198; 239/532
[58] Field of Search ............................ 134/167 R, 168 R, 134/198, 201; 239/532; 15/236.15

[56] References Cited

U.S. PATENT DOCUMENTS

| | | | |
|---|---|---|---|
| Re. 27,612 | 4/1973 | Ruppel et al. ........................ 239/227 |
| 1,103,786 | 7/1914 | Lewis . | |
| 2,526,265 | 10/1950 | Nulph . | |
| 3,095,001 | 6/1963 | Steltz . | |
| 3,460,988 | 8/1969 | Kennedy et al. ............................ 134/1 |
| 3,542,593 | 11/1970 | Pribbernow . | |
| 3,599,871 | 8/1971 | Ruppel et al. ........................ 239/227 |
| 3,669,741 | 6/1972 | Dunnahoe et al. .................. 134/22 R |
| 3,724,764 | 4/1973 | Hall . | |
| 3,727,841 | 4/1973 | Hengesbach . | |
| 3,874,594 | 4/1975 | Hatley ................... 239/227 |
| 3,880,359 | 4/1975 | Novy .................... 239/565 |
| 3,893,630 | 7/1975 | Bochmann et al. ................. 239/587 |
| 3,895,756 | 7/1975 | Jaeger ................... 239/227 |
| 3,908,910 | 9/1975 | Detwiler . | |
| 4,022,382 | 5/1977 | Enghahl, Jr. . | |
| 4,026,802 | 5/1977 | Akae ...................... 210/151 |
| 4,031,910 | 6/1977 | Lawson ................... 134/167 C |
| 4,045,344 | 8/1977 | Yokota .................... 210/106 |
| 4,146,406 | 3/1979 | Sampsell . | |
| 4,220,170 | 9/1980 | Hebert et al. .................... 134/167 R |
| 4,238,244 | 12/1980 | Banks .................... 134/22 R |
| 4,253,947 | 3/1981 | Fan et al. ................... 210/610 |
| 4,322,296 | 3/1982 | Fan et al. ................... 210/610 |
| 4,351,721 | 9/1982 | Frandsen .................. 210/150 |
| 4,396,507 | 8/1983 | Grant .................... 210/150 |
| 4,426,233 | 1/1984 | Manabe et al. ........................ 134/21 |
| 4,482,458 | 11/1984 | Rovel et al. ............................ 210/603 |
| 4,560,479 | 12/1985 | Heijnen .................. 210/603 |
| 4,655,924 | 4/1987 | Heijnen .................. 210/603 |
| 4,716,849 | 1/1988 | Conn et al. . | |
| 4,716,917 | 1/1988 | Schmidt .............................. 134/167 R |
| 4,800,021 | 1/1989 | Desbos .................... 210/605 |
| 4,805,650 | 2/1989 | Yasui et al. ........................... 134/57 R |
| 4,827,563 | 5/1989 | Gordon . | |
| 4,828,651 | 5/1989 | Lumbroso et al. ........................ 201/2 |

(List continued on next page.)

Primary Examiner—Frankie L. Stinson
Attorney, Agent, or Firm—Roberts, Abokhair & Mardula LLC

[57] ABSTRACT

An apparatus and method for cleaning and maintaining Biologically Accelerated Treatment ("BAT") support media disposed within a fixed wastewater treatment tank is disclosed. The cleaning apparatus includes a hollow shaft and a perpendicularly placed diffuser having a plurality of orifices, which may also include nozzles. An air blower or a water pump is attached to the hollow shaft. The cleaning apparatus is inserted into a wastewater treatment tank, and either air or water is forced through the orifices or nozzles of the diffuser, respectively. The air or water generates a force that is directed toward the BAT support media to effect cleaning. In one embodiment, a hinge is provided between the shaft and diffuser to enable the diffuser to pivot downward, to a position close to parallel with the hollow shaft, so that the cleaning apparatus can be inserted through multiple risers that provide access to an underground wastewater treatment tank. The force of the air or water exiting the orifices or nozzles, respectively, position the diffuser in a proper cleaning position when the air or water pressure is sufficiently high. An adjustment cord is provided in case the force of the air or water is insufficient to raise the diffuser to an approximately right angle with respect to the hollow shaft. A handle and extension shafts are also contemplated for use with the cleaning apparatus.

38 Claims, 26 Drawing Sheets

U.S. PATENT DOCUMENTS

| | | | |
|---|---|---|---|
| 4,832,848 | 5/1989 | Velebil et al. | 210/617 |
| 4,859,249 | 8/1989 | Valentini | 134/22.18 |
| 4,982,896 | 1/1991 | Crow . | |
| 4,986,476 | 1/1991 | Hour | 239/227 |
| 5,037,028 | 8/1991 | Evans . | |
| 5,085,766 | 2/1992 | Born | 210/150 |
| 5,279,675 | 1/1994 | Verbeek | 134/22.1 |
| 5,301,702 | 4/1994 | McKinney . | |
| 5,386,942 | 2/1995 | Dietle . | |
| 5,460,193 | 10/1995 | Levallois et al. | 134/56 R |
| 5,468,392 | 11/1995 | Hanson et al. | 210/615 |
| 5,487,829 | 1/1996 | Safferman et al. | 210/151 |
| 5,558,763 | 9/1996 | Funakoshi et al. | 210/150 |
| 5,573,024 | 11/1996 | Devaney et al. . | |
| 5,642,746 | 7/1997 | Sayce . | |
| 5,725,322 | 3/1998 | Evans . | |

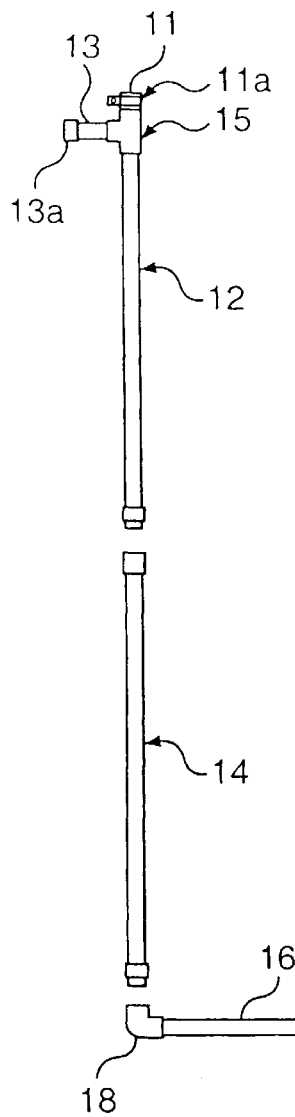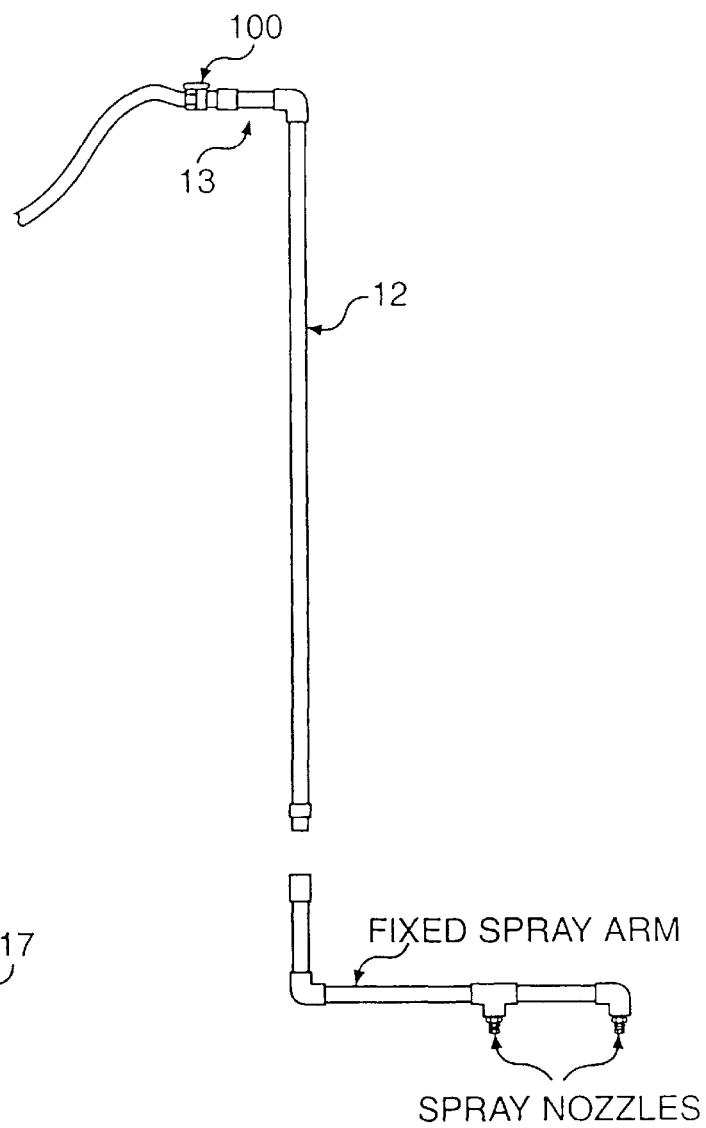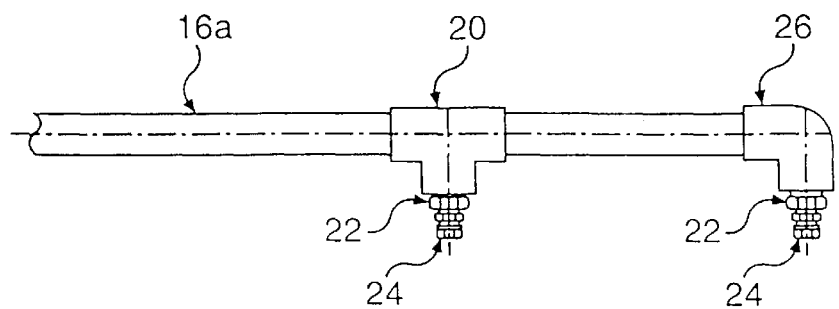
FIG. 3
FIG. 5
FIG. 4

FIXED FILM MEDIA CLEANER APPARATUS AND METHOD

FIELD OF THE INVENTION

The present invention relates generally to an apparatus and method for cleaning Biologically Accelerated Treatment (BAT) support media in a fixed wastewater treatment plant. In particular, the present invention is directed to an economical and efficient means of periodically cleaning and maintaining BAT support media in a fixed wastewater treatment plant without having to remove the BAT support media from the treatment plant prior to its cleaning.

BACKGROUND AND DESCRIPTION OF THE RELATED ART

It has become increasingly important to treat wastewater in an efficient manner so as to protect the health and well being of humankind. In past years the treatment of wastewater has advanced considerably to include the use of biological as well as chemical agents. One example of these advancements is the now common practice of treating wastewater with biologically active organisms that digest, and thus eliminate, organic material from the wastewater. These biologically active organisms ("biomass") grow as a biofilm on support media that serve as carriers for the biologically active organisms. These biofilms, sometimes referred to as attached growth systems, are commonly grown on fixed surfaces that support the biomass. In many instances, the fixed surface area is quite large so as to accommodate the growth of a large amount of biomass for optimum efficiency of wastewater treatment.

In these attached growth systems, microorganisms growing on the fixed support media remove soluble contaminants from the wastewater by utilizing them as a source of energy for growth and production of new microorganisms. As new organisms form, the biological growth slowly becomes thicker, thereby resulting in anoxic conditions near the surface of the support media. As the bacterial mass builds, adhesion is weakened in the anoxic areas, and, as a result, the upper layers of the growth periodically "slough off." This sloughing off exposes a clean surface on which aerobic growth continues to accumulate.

The accumulation of biomass on the surfaces of the fixed support media also provides for entrapment of organic solids, which then are attacked by extracellular enzymes that solubilize the solids to make them available to the microorganisms as a further food source.

These processes take place in treatment plants that usually are buried underground. To access these plants, only small access openings in risers at grade level are provided. These grade level access openings allow an operator to perform routine inspection and maintenance of the aerator and biofilm support media. It is important to keep the grade level access openings small to improve aesthetics. Typically, the top of the underground tank is within 12 inches below the ground surface; however, this distance may be considerably greater than 12 inches for some installations, e.g., exceeding 60 inches or more. Thus, the risers connect to the underground wastewater treatment plants, and also provide access to the tanks from the ground level.

As a biomass grows, it begins to hinder the passage of wastewater through the biofilm support media. Therefore, the need to clean the support media in an efficient manner becomes critical. Unfortunately, the cleaning of support media has not enjoyed the same advancements as the treatment of wastewater. Thus, there is a need for an economical and efficient means by which an operator of a treatment facility can efficiently and easily clean and maintain the fixed support media in the treatment compartment or tank. Because the blocks of fixed support media can be quite large, it is highly desirable to clean the support media in the wastewater treatment tank, rather than removing the support media for cleaning outside the tank. Experience has shown that periodic cleaning of fixed support media enhances the overall performance and efficiency of a wastewater treatment system.

Currently used fixed support media cleaning apparatuses have several shortcomings that are difficult to overcome, and in many instances are a hindrance when cleaning and maintaining a wastewater treatment plant. These shortcomings include difficulty in cleaning the media in plants that utilize several risers, and that are accessible only through small ground level openings. To clean the BAT support media in the usual case, an operator must first remove the BAT support media from the underground wastewater treatment tank. The total cleaning process translates into great expenditures of time, resources, and money because the underground wastewater treatment tank first must be disassembled, followed by removing the support media, cleaning them, and placing them back into the wastewater treatment tank to await future tank reassembly.

Several inventors have disclosed the use of various devices for cleaning different types of tanks. For instance, U.S. Pat. No. 4,716,917 to Schmidt discloses a tank washing system, preferably for washing ship's tanks, that comprises several vertical rods having rotating nozzles attached by nozzle holders. The nozzles rotate via a complex gear system comprising a pivot bearing. The nozzle holder rotates via a drive and a drive member.

U.S. Pat. No. 4,859,249 to Valentini discloses a process for cleaning an enclosed vessel, wherein a telescoped housing utilizes a multi-nozzle rotating head. Similarly, U. S. Pat. No. 3,460,988 to Kennedy. Jr., et al. discloses an apparatus for spray treating boundary surfaces of enclosures, such as tanks. Disclosed in this invention is a sonic spray comprising a turret adapted to be driven about a vertical axis. The turret carries two sonic spray units on its opposing sides.

Another device for cleaning tanks is disclosed in U.S. Pat. No. 3,874,594 to Hatley. This device consists of a hollow shaft having a rotating nozzle attached at its distal end. The rotation of the nozzle is controlled by a worm gear mechanism located within the hollow shaft. The worm gear mechanism is driven by a complex gear system comprising a clutch and bevel gear mechanism placed within a housing attached to the upper end of the hollow shaft.

Another rotating nozzle device is described in U.S. Pat. No. 3,893,630 to Bochmann, et al. This device discloses a swivel outlet attached to a sprayer. The swivel outlet includes a first and second housing. The first housing includes a recessed cylindrical portion defined by cylindrical surfaces. A passageway extends radially outward from the recess of an enlarged portion designed to snugly receive the end of a discharge tube. The second housing includes a raised cylindrical housing dimensioned to fit snugly into the upper part of the recess of the first housing. A groove is provided about the cylindrical portion for seating an O-ring that functions to seal the cylindrical portion, while permitting rotation of the second housing with respect to the first housing about a common axis of the two cylindrical portions.

Other cleaning systems include those disclosed in U.S. Pat. Nos. 4,031,910 to Lawson, 4,805,650 to Yasui. et al., 5,460,193 to Levallois. et al., and 3,599,871 and Re. 27,612 to Ruppel, et al. The Lawson patent discloses an articulated spray applicator for cleaning flues comprising connected angular conduits having a plurality of orifices.

The Yasui, et al. patent discloses an apparatus for cleaning tanks comprising a support arm with a folding arm rotatably mounted to the lower end thereof.

The Levallois, et al. patent describes a device for cleaning the walls of a tank comprising a rotating stand equipped with at least one pressurized cleaning fluid spray element. The two Ruppel, et al. patents disclose a jet spray cleaner comprising a collapsible mechanism with a plurality of rotating jet nozzles that are driven by gears.

In order to effectively service BAT media located within a wastewater treatment tank, a new apparatus and method of cleaning BAT media is needed which will allow easy periodic cleaning and maintenance of fixed biofilm support media without the need to first remove the biofilm from the wastewater treatment plant. In addition, a new apparatus and method of cleaning BAT support media is needed that also will accommodate a range of sizes and configurations of ground level openings, including various risers.

SUMMARY OF THE INVENTION

It is therefore an object of the present invention to provide a BAT support media cleaning apparatus and method that enables an operator to clean the BAT support media within a wastewater treatment tank.

It is an additional object of the present invention to provide a BAT support media cleaning apparatus and method that enables an operator to clean any portion of the BAT support media within a wastewater treatment tank, regardless of where the BAT support media is located within the wastewater treatment tank.

It is yet another object of the present invention to provide a BAT support media cleaning apparatus and method that enables an operator to clean various sizes of support media blocks that may be located within wastewater treatment tanks.

It is a further object of the present invention to provide a BAT support media cleaning apparatus that is quick and easy to assemble and disassemble.

It is still a further object of the present invention to provide a BAT support media cleaning apparatus that utilizes a hinged diffuser arm for cleaning the BAT support media located within a wastewater treatment tank that has a plurality of risers.

It is yet a further object of the present invention to provide a BAT support media cleaning apparatus that economically and efficiently cleans the BAT support media located within a wastewater treatment tank.

It is still an additional object of the present invention to provide a BAT support media cleaning apparatus and method that utilizes compressed air to clean the BAT support media located within a wastewater treatment tank.

It is yet an additional object of the present invention to provide a BAT support media cleaning apparatus and method that utilizes water to clean the BAT support media located within a wastewater treatment tank.

These and other objects and advantages of the present invention will be apparent to those persons skilled in the art upon examination of the detailed description of the present invention, including the figures, and the appended claims.

The present invention comprises a hollow shaft having an upper end and a lower end. Attached to the upper end of the shaft is a tee joint. Attached to the upper portion of the tee joint is a hollow pipe section, which has a clamp placed about its circumference. The clamp is used to attach a blower or water pump to the hollow pipe section. Coupled to the perpendicular portion of the tee joint is a handle having a cap. In an alternate embodiment, the blower or water pump is attached to the distal end of the handle. A second hollow shaft is coupled to the lower end of the shaft. Coupled to the distal end of the second shaft is an elbow. A spray arm (e.g., a diffuser) is attached to the other end of the elbow.

The diffuser comprises a plurality of orifices placed along its length to pass air therethrough. In alternate embodiments, the diffuser allows water to pass through orifices with nozzles attached thereto. Water exits a nozzle at a pressure higher than when it entered the diffuser support media cleaning tool.

In order to clean the support media in a wastewater treatment tank, the operator positions the diffuser through a ground level access opening in a riser, and then through a mounting casting. Once this is accomplished, compressed air or water is supplied through the diffuser media cleaning tool until it reaches the diffuser. At this point, the compressed air or pressurized water flows through the plurality of orifices or nozzles, respectively. The air creates bubbles that rise through the water to create a vigorous boiling action that becomes stronger as more air pressure is used, thereby cleaning the surfaces of the support media. Similarly, the water creates a high pressure "jet" action by which the support media are cleaned. To clean the entire support media structure within a wastewater treatment tank, the operator simply moves the diffuser support media cleaning tool around the tank.

A hinged mechanism connected between the shaft and the diffuser is also an integral part of one embodiment of the present invention. The hinged mechanism permits the diffuser to pivot downward so the diffuser support media cleaning tool can be inserted through multiple risers and a mounting casting.

The hinged diffuser swings freely on hinged joint threads, and further allows compressed air or water to pass freely from the shaft to the diffuser. A diffuser stop retains the diffuser in a downward position at a slight angle with respect to the shaft when there is no air or water passing therethrough. In addition, the diffuser stop prevents the hinged diffuser from turning in the wrong direction when air or water is forced through the diffuser, and also serves as a limiter (to approximately 90° between the diffuser and the shaft) when air or water is passing therethrough.

When the hinged diffuser is filled with air, buoyant and thrust forces operate to position the diffuser in the cleaning position (approximately 90°). When water is used to clean the support media, high pressure water forces the diffuser tip to swing up to the cleaning position (approximately 90°). Once the water or air is "turned off," the hinged diffuser automatically repositions itself at a slight angle with respect to the shaft, thereby allowing the operator to remove the hinged diffuser from the treatment tank via the risers and mounting casing.

A spray arm adjustment cord is utilized when the water or air pressure is insufficiently high to position the diffuser in the cleaning position (approximately 90°). In this embodiment, one end of the spray arm adjustment cord is attached to a cleat located on the shaft once the other end of the cord has pulled the diffuser into the cleaning position. This action of the cord is effected, in part, due to a positioning means such as an eye screw that is screwed into the first tee connector, wherein the cord passes through the eye and thereafter attaches to a distal point on the diffuser.

BRIEF DESCRIPTION OF THE DRAWINGS

FIG. 3 shows a disassembled fixed support media cleaning tool.

FIG. 4 shows a fixed diffuser with nozzles.

FIG. 5 shows a fixed support media cleaning tool with a valve.

DETAILED DESCRIPTION OF THE INVENTION

The present invention comprises an apparatus and method for cleaning Biologically Accelerated Treatment ("BAT") support media ("support media cleaning tool") in a fixed wastewater treatment plant ("treatment plant" or "treatment tank"). The support media cleaning tool of the present invention can accommodate a range of sizes of treatment plants. The dimensions of the support media cleaning tool, including shafts, handles, elbows, tee connectors, pipes, and other dimensions and quantities specified herein may vary according to the dimensions and specifications of a given treatment plant. Therefore, numbers and dimensions specified herein are not to be construed as limitations on the scope of the present invention but are meant to be merely illustrative of one particular embodiment.

Figure 1:
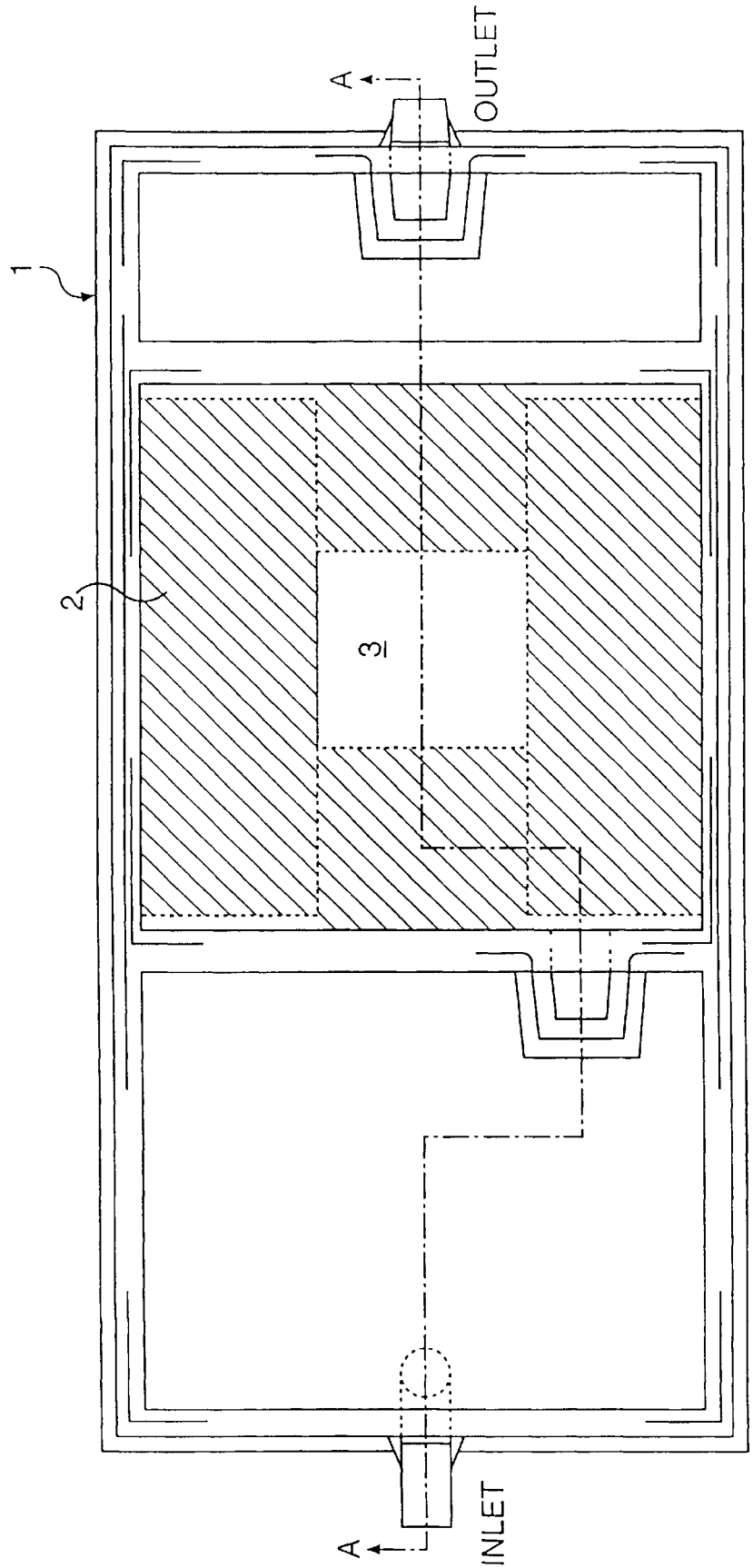
FIG. 1 shows a top view of a wastewater treatment plant with submerged fixed support media.

FIG. 1 shows a top view of a wastewater treatment plant showing one level of submerged fixed support media. Wastewater treatment tank 1 comprises blocks of submerged BAT support media 2 resting on supports in the treatment tank. BAT support media 2 surround a substantially rectangular central access opening 3; however, other shapes are also contemplated for use according to the present invention.

Figure 2:
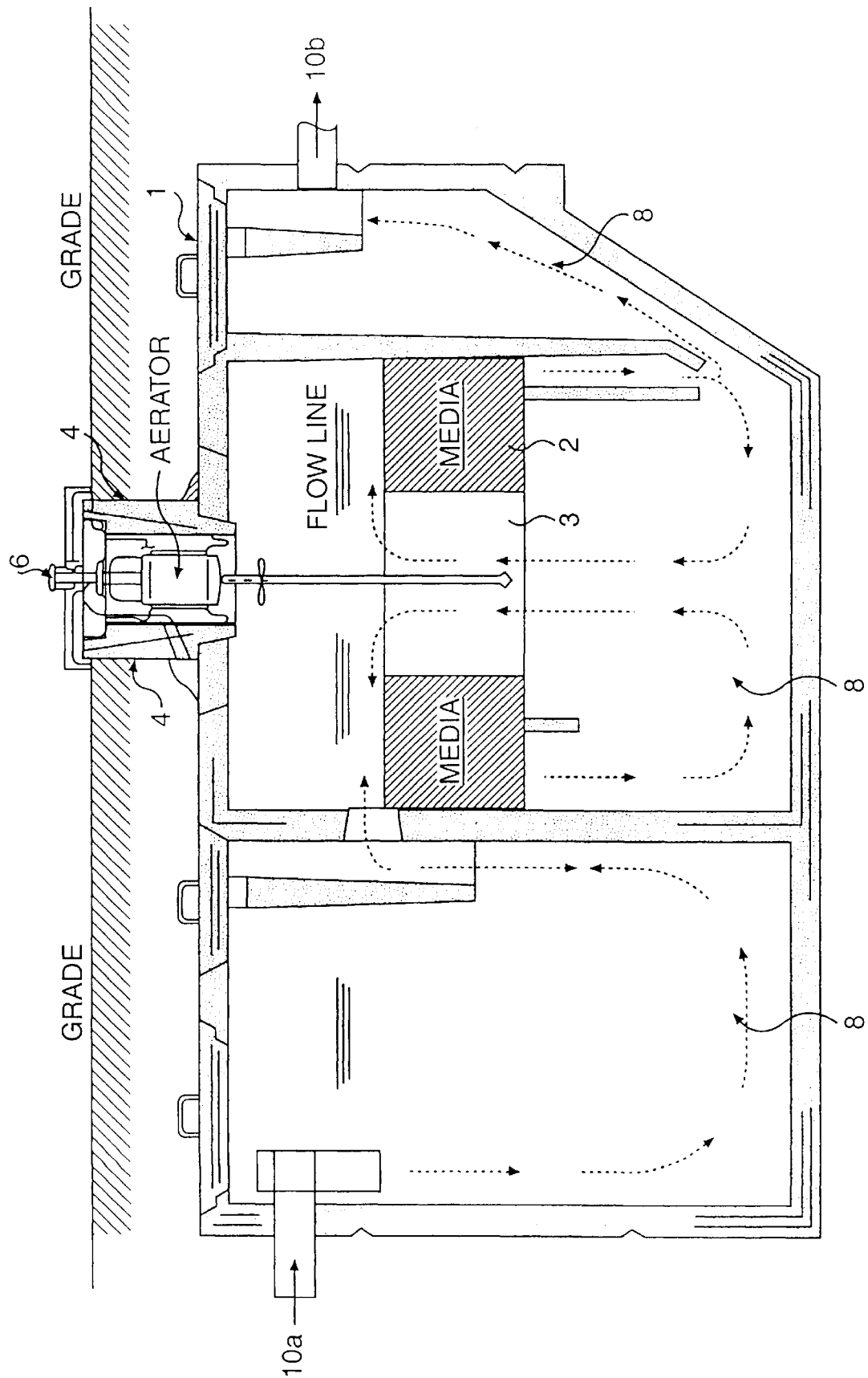
FIG. 2 shows a side cross sectional view of a wastewater treatment plant with submerged fixed support media.

FIG. 2 shows a side cross sectional view of wastewater treatment plant 1 with blocks of submerged fixed BAT support media 2. In this embodiment, the wastewater treatment plant includes mounting casting 4 that extends to the grade. Mounting casting 4 opens to ground level access opening 6. Settling compartments 8 are at various locations throughout wastewater treatment plant 1. Directions of flow of the liquid wastewater are indicated by arrows, including also inlet 10a and outlet 10b.

FIG. 3 shows a disassembled fixed diffuser support media cleaning tool 10. In this embodiment, the diffuser support media cleaning tool comprises hollow shaft 12 having an upper end and a lower end. Attached to the upper end of the shaft is tee joint 15. Attached to the upper portion of the tee joint, and substantially parallel to the shaft, is hollow pipe section 11. Placed about the circumference of pipe section 11 is hose clamp 11a. A blower (not shown) is attached to pipe section 11 by hose clamp 11a. Coupled to the perpendicular portion of tee joint 15 is handle 13 with cap 13a located at its distal end. In an alternate embodiment, the blower is attached to the distal end of the handle.

In the preferred embodiment, second hollow shaft 14 is coupled to the lower end of shaft 12. Coupled to the distal end of second shaft 14 is elbow 18. Fixed diffuser 16 (e.g., a spray arm) is attached to the distal end of elbow 18. Cap 17 is fixed to the fixed diffuser's distal end, which is defined as a diffuser tip. In a preferred embodiment, fixed diffuser 16 is at a right angle with respect to shaft 12. In alternate embodiments, the diffuser may be at any of a range of other selected fixed angles, or hinged with the possibility of orienting the fixed diffuser at any of a range of angles, as is explained below in more detail. The diffuser further comprises a plurality of orifices placed along its length to permit the passage of air therethrough. Alternatively, when cleaning is to be performed with water, a plurality of nozzles is used. In the case of water utilization, a hose is attached to a pump and fitted to pipe section 11 by clamp 11a, or, alternatively, to the distal end of handle 13.

FIG. 4 shows a fixed diffuser that uses water. As shown, fixed diffuser 16a comprises at least one downward facing reducing tee joint 20 located at a selected length from the distal end of the fixed diffuser, as well as downward facing reducing elbow 26 at the distal end of the fixed diffuser. Depending downward from reducing tee joint 20 and reducing elbow 26 is the combination of bushing 22 and nozzle mechanism 24. The bushing and nozzle mechanism combination can be placed at other locations along fixed diffuser 16a. The water exiting the nozzles is at a pressure higher than when it entered the fixed diffuser support media cleaning tool, due to the reduced size of the reducing tee joint, the reducing elbow, and the nozzles.

FIG. 5 shows a fixed diffuser support media cleaning tool having control valve 100 located at the distal end of handle 13. Attached to the valve is a hose or a pipe that carries either compressed air or pressurized water. The valve controls the pressure of water entering the diffuser support media cleaning tool, or, alternatively, the pressure of air. The valve can be attached to either a fixed diffuser support media cleaning tool or a hinged diffuser support media cleaning tool.

Figure 6:
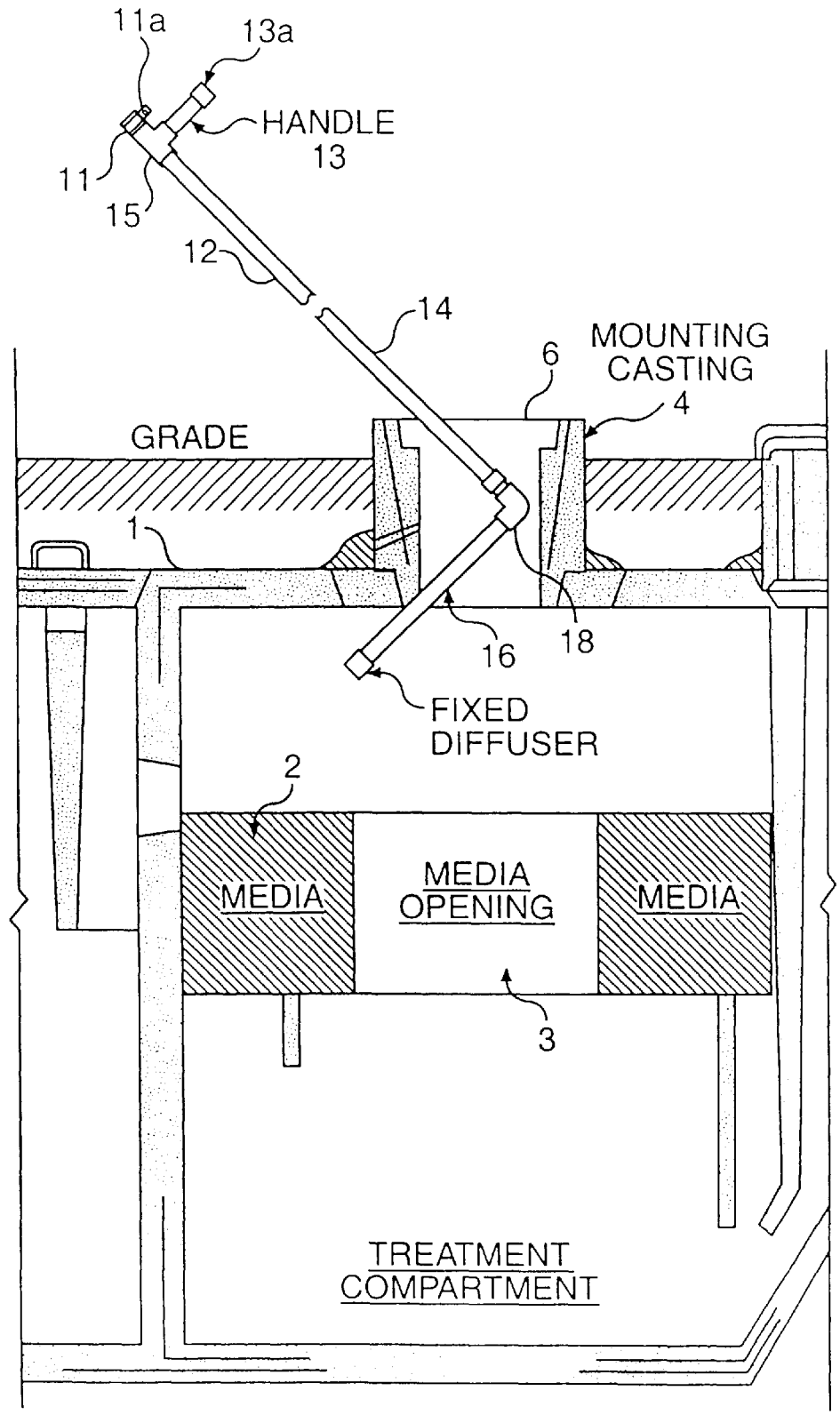
FIG. 6 shows a fixed support media cleaning tool being inserted into a wastewater treatment tank.

FIG. 6 shows a fixed diffuser support media cleaning tool, with 90° elbow 18, being inserted into treatment plant 1. The fixed diffuser support media cleaning tool passes through ground level access opening 6 and through mounting casting 4.

FIGS. 7a–7f show the fixed diffuser support media cleaning tool at various positions within the treatment tank.

Figure 7A:
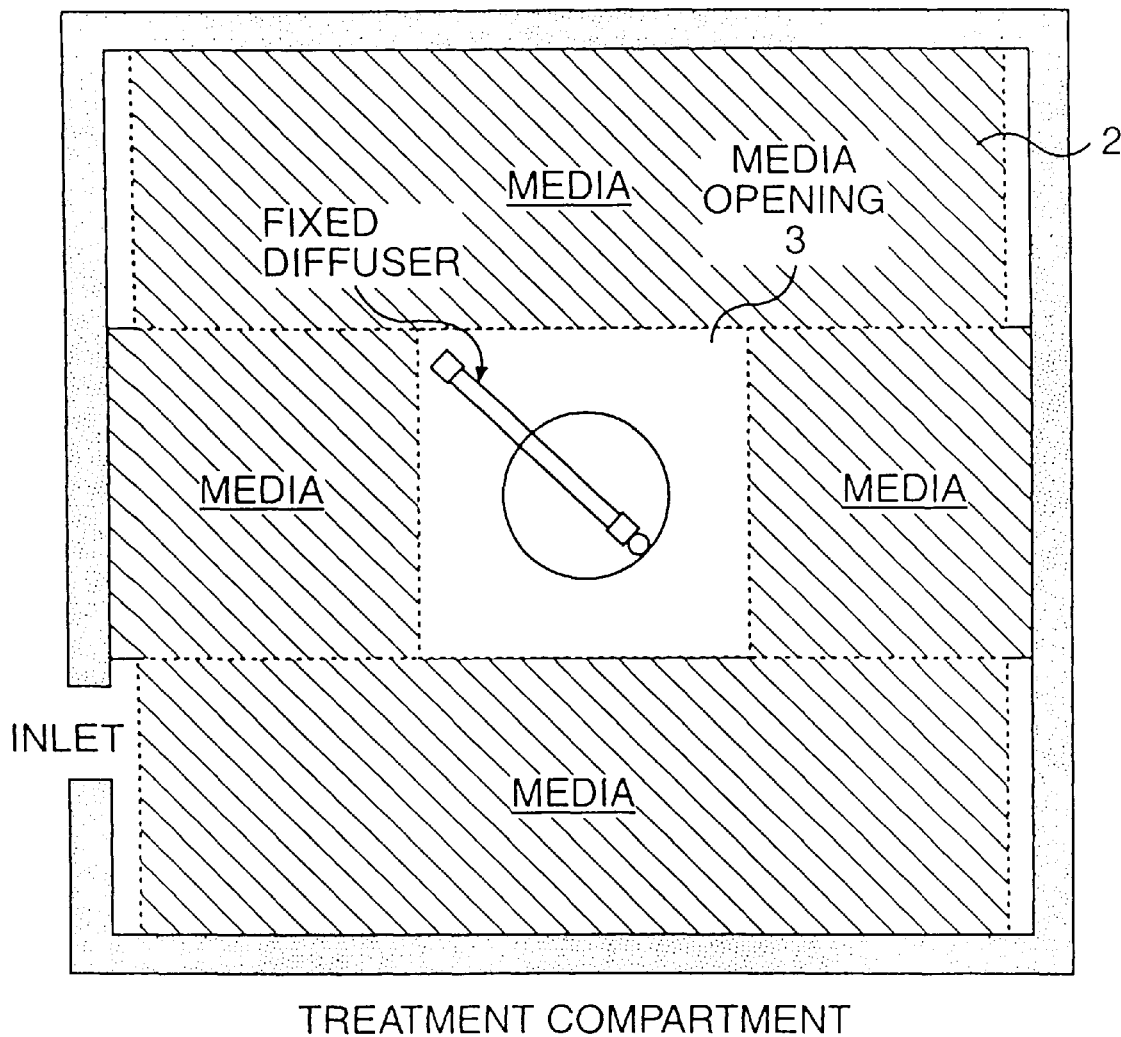
FIG. 7a shows a fixed support media cleaning tool inserted through an opening in a layer of support media.

FIG. 7a shows the fixed diffuser support media cleaning tool being inserted through support media access opening 3.

Figure 7B:
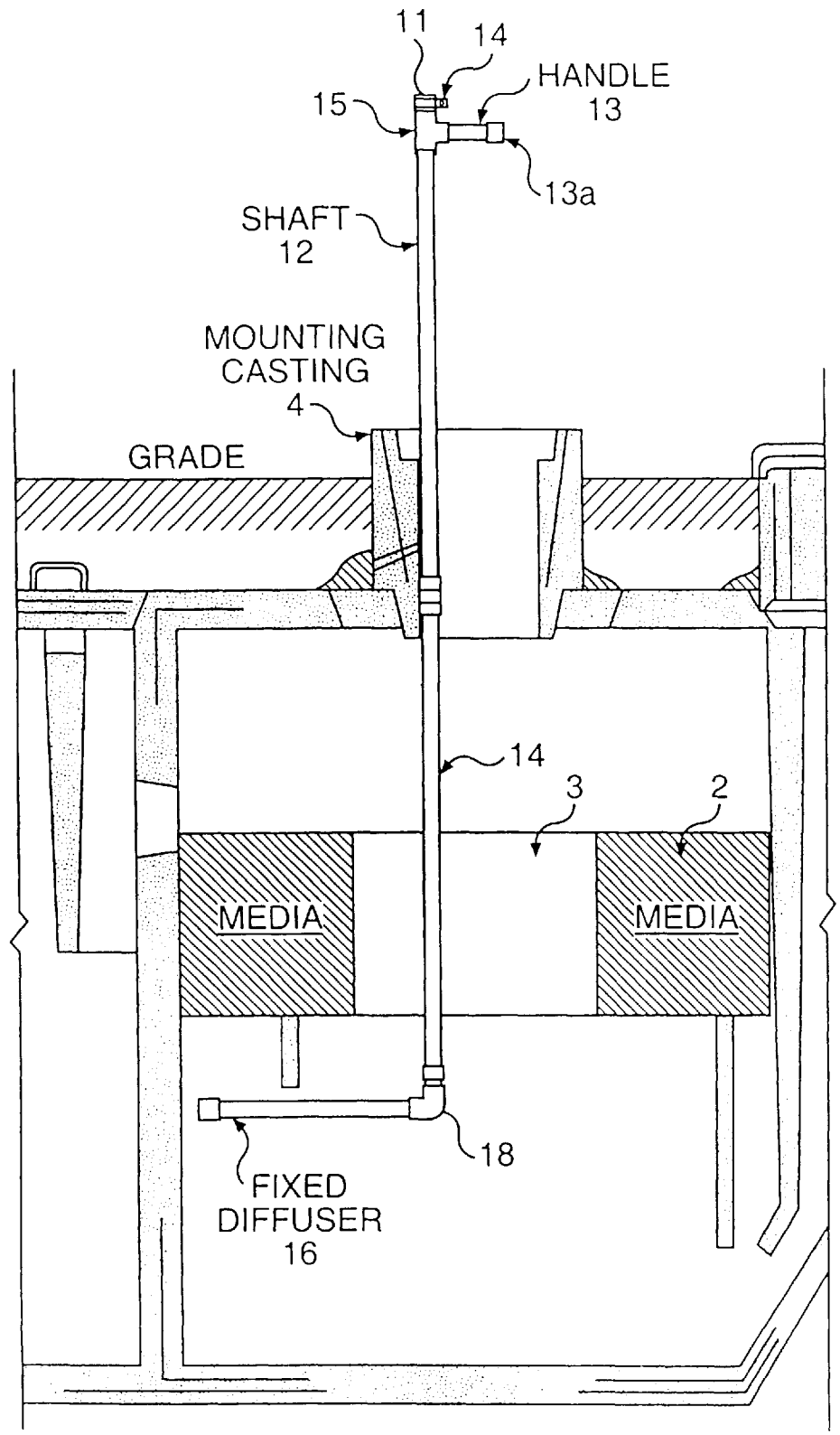
FIG. 7b shows a fixed support media cleaning tool in a cleaning position beneath blocks of support media.

FIG. 7b shows the fixed diffuser support media cleaning tool in a cleaning position beneath a block of BAT support media 2.

Figure 7C:
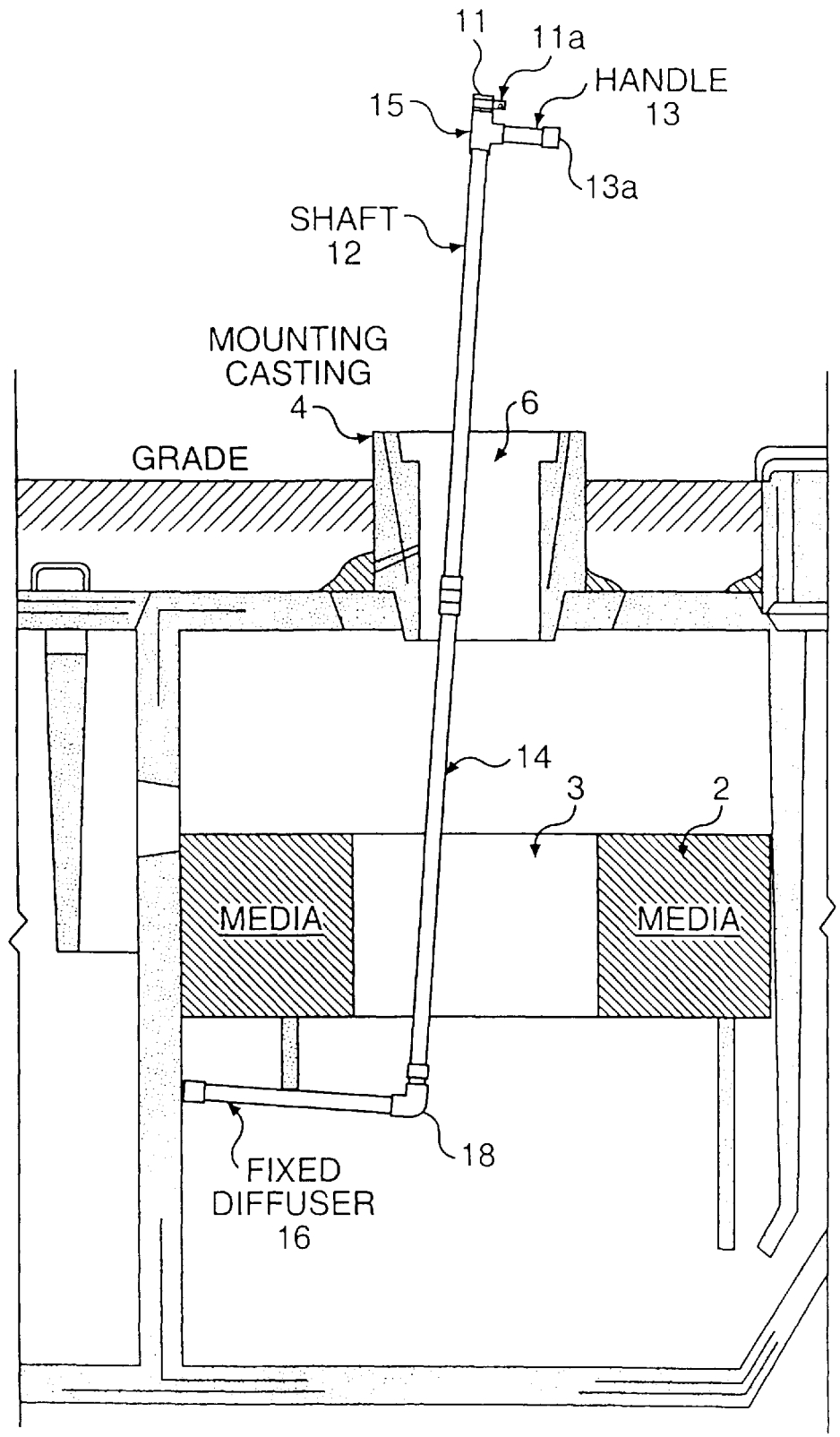
FIG. 7c shows a fixed support media cleaning tool in a cleaning position with the diffuser tip touching a wall of a wastewater treatment tank.

FIG. 7c shows the fixed diffuser support media cleaning tool in a cleaning position beneath a block of BAT support media, wherein the diffuser tip is touching the wall of the treatment tank. FIG. 7c also shows that the fixed diffuser is able to span the entire length of the treatment tank to ensure complete "coverage" of the BAT support media.

Figure 7D:
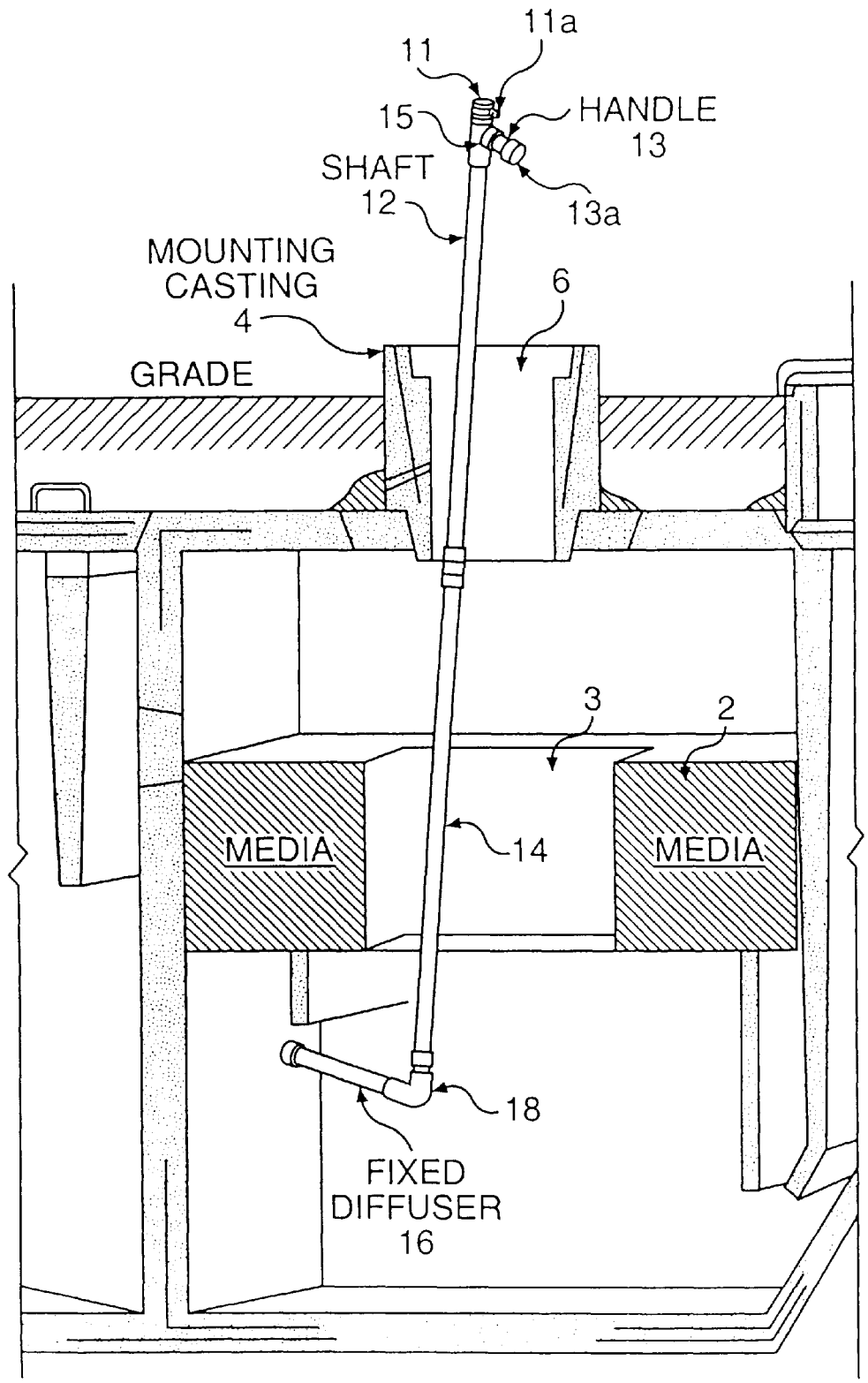
FIG. 7d shows a fixed support media cleaning tool in a cleaning position with the diffuser tip in a corner of a wastewater treatment tank.

FIG. 7d shows the fixed diffuser media support cleaning tool in a cleaning position beneath a block of BAT support media, wherein the tip of the diffuser is in the corner of the treatment tank.

Figure 7E:
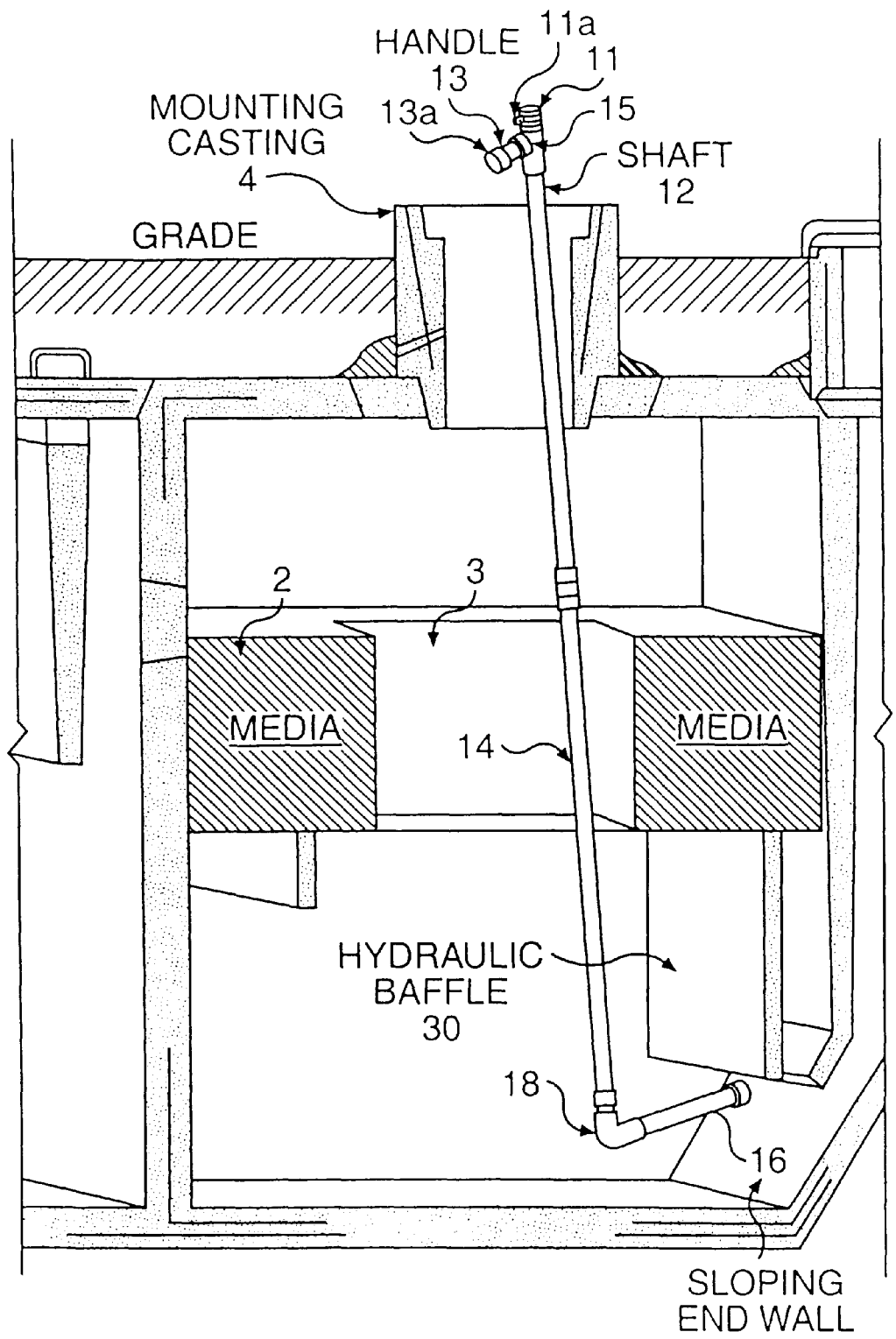
FIG. 7e shows a fixed support media cleaning tool in a cleaning position with the diffuser tip in a corner of a wastewater treatment tank and beneath a hydraulic baffle.

FIG. 7e shows the diffuser support media cleaning tool in a cleaning position beneath a block of BAT support media, wherein the tip of the diffuser is in a corner of the treatment tank and beneath hydraulic baffle 30.

FIGS. 7d and 7e demonstrate a proper length of upper shaft 12 so that fixed diffuser 16 can be manipulated from above the ground when it is in a cleaning position beneath the blocks of BAT support media.

Figure 7F:
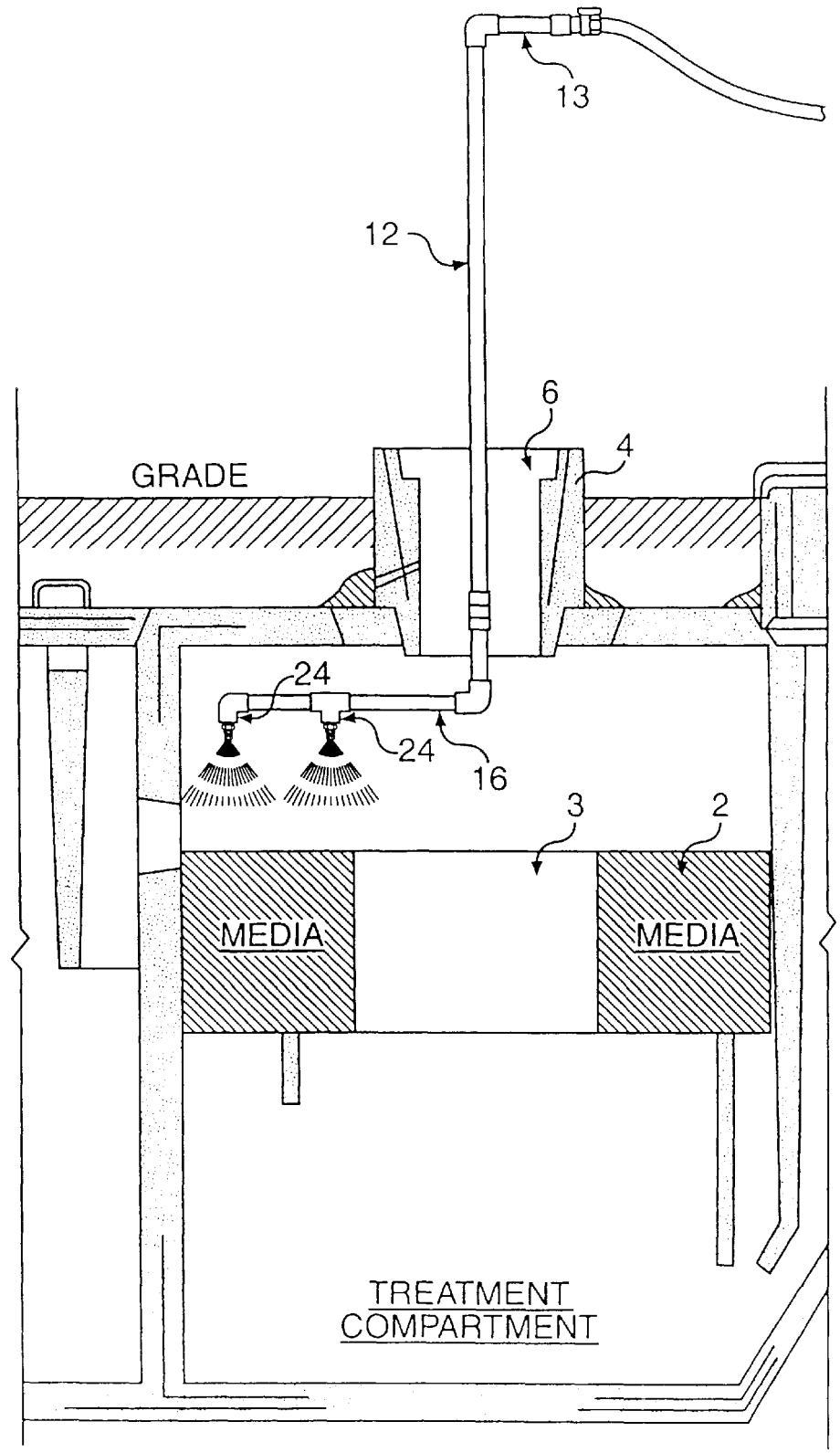
FIG. 7f shows a fixed support media cleaning tool in a cleaning position above blocks of support media.

FIG. 7f shows a fixed support media cleaning tool in a cleaning position above blocks of support media as would be appropriate for cleaning by the use of pressurized water.

Another embodiment of the present invention is a hinge mechanism that connects the shaft and the diffuser, resulting in a hinged diffuser. The hinge mechanism allows the diffuser to pivot downward so that the diffuser support media cleaning tool can be inserted through a ground level access opening. This hinge configuration further permits the diffuser support media cleaning tool to be inserted through multiple risers and mounting casting. In this way, the diffuser support media cleaning tool is positioned above or below the BAT support media in a proper cleaning position.

Figure 8:
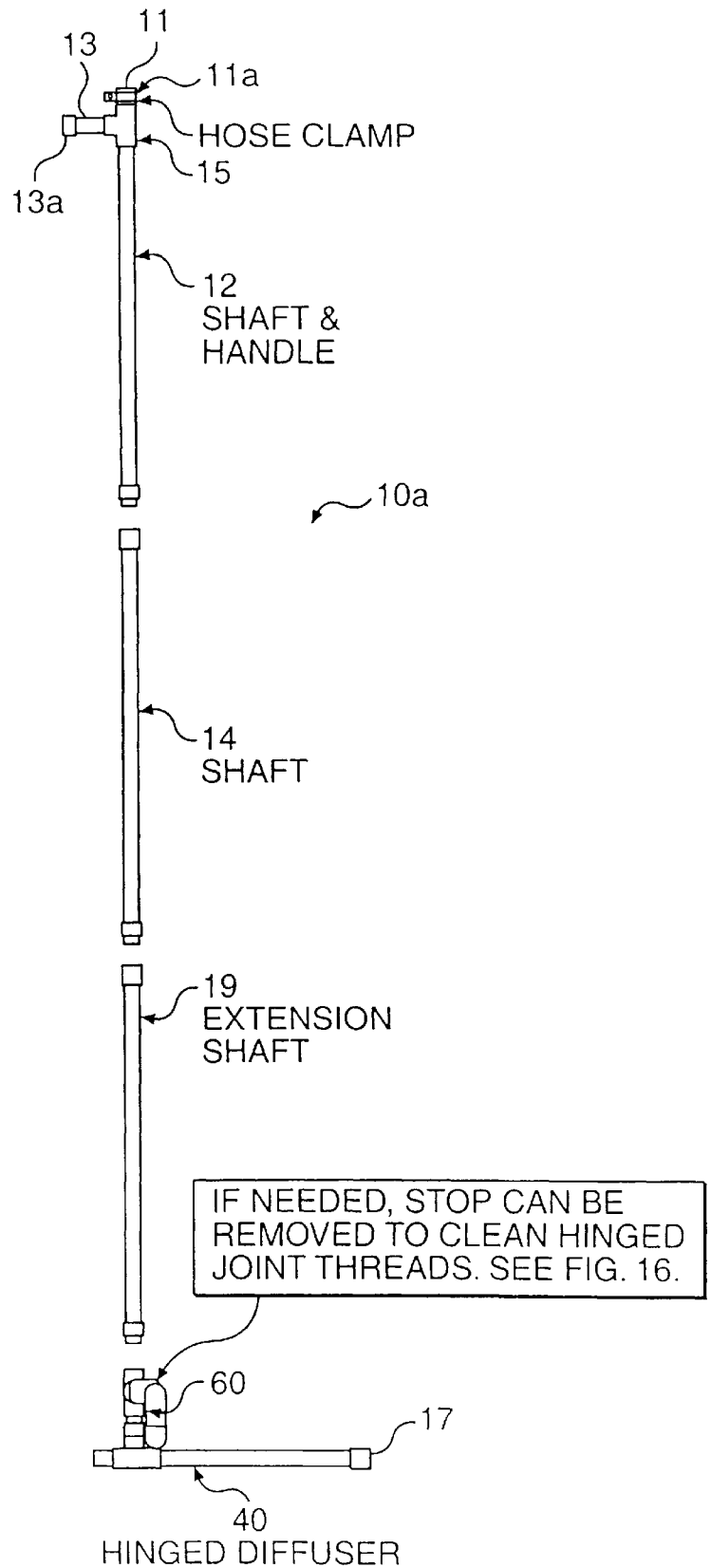
FIG. 8 shows a disassembled hinged diffuser support media cleaning tool.

FIG. 8 shows a disassembled hinged diffuser support media cleaning tool. In this embodiment, the hinged diffuser support media cleaning tool comprises hollow shaft 12 having an upper end and a lower end. Coupled to the upper end of the shaft is tee joint 15. Attached to the upper portion of the tee joint, and substantially parallel to shaft 12, is hollow pipe section 11. Placed about the circumference of pipe section 11 is clamp 11a for attaching a blower (not shown). Coupled to the perpendicular portion of tee joint 15 is handle 13 with cap 13a located at its distal end. In an alternate embodiment, the blower is attached to the distal end of handle 13.

In a preferred embodiment second hollow shaft 14 is coupled to the lower end of shaft 12. Coupled to the opposing end of second shaft 14 is extension shaft 19. Several extension shafts can be placed at this point in order to elongate hinged diffuser support media cleaning tool 10a. Attached to the distal end of extension shaft 19 is an elbow (not shown). Hinged diffuser 40 having cap 17 located at the distal end is coupled to the opposing end of the elbow (e.g., opposite extension shaft 19). Hinged diffuser 40 further comprises a plurality of orifices placed along its length for the passage of air therethrough.

Figure 9A:
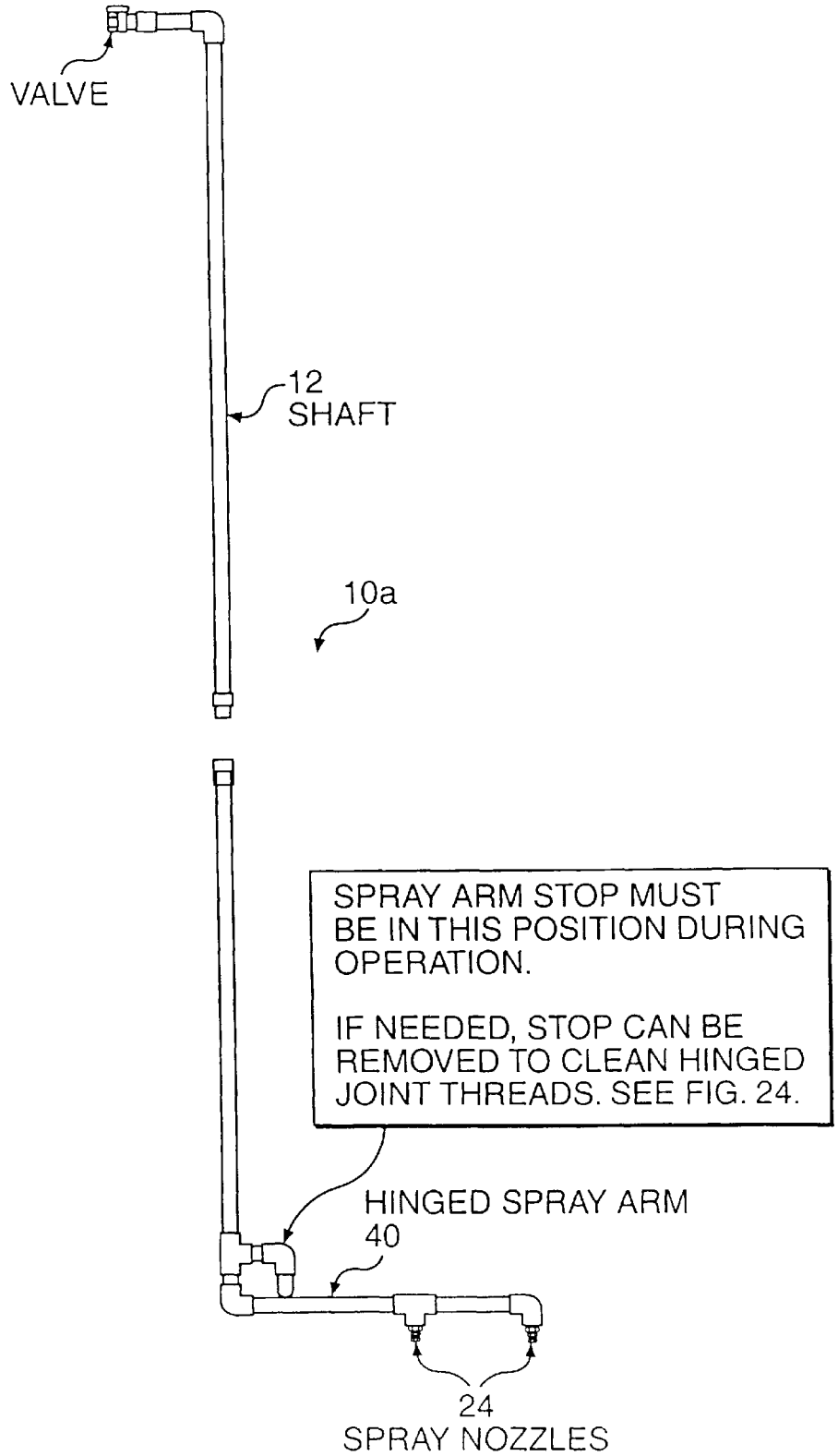
FIG. 9a shows a hinged diffuser support media cleaning tool with a diffuser stop.
Figure 9B:
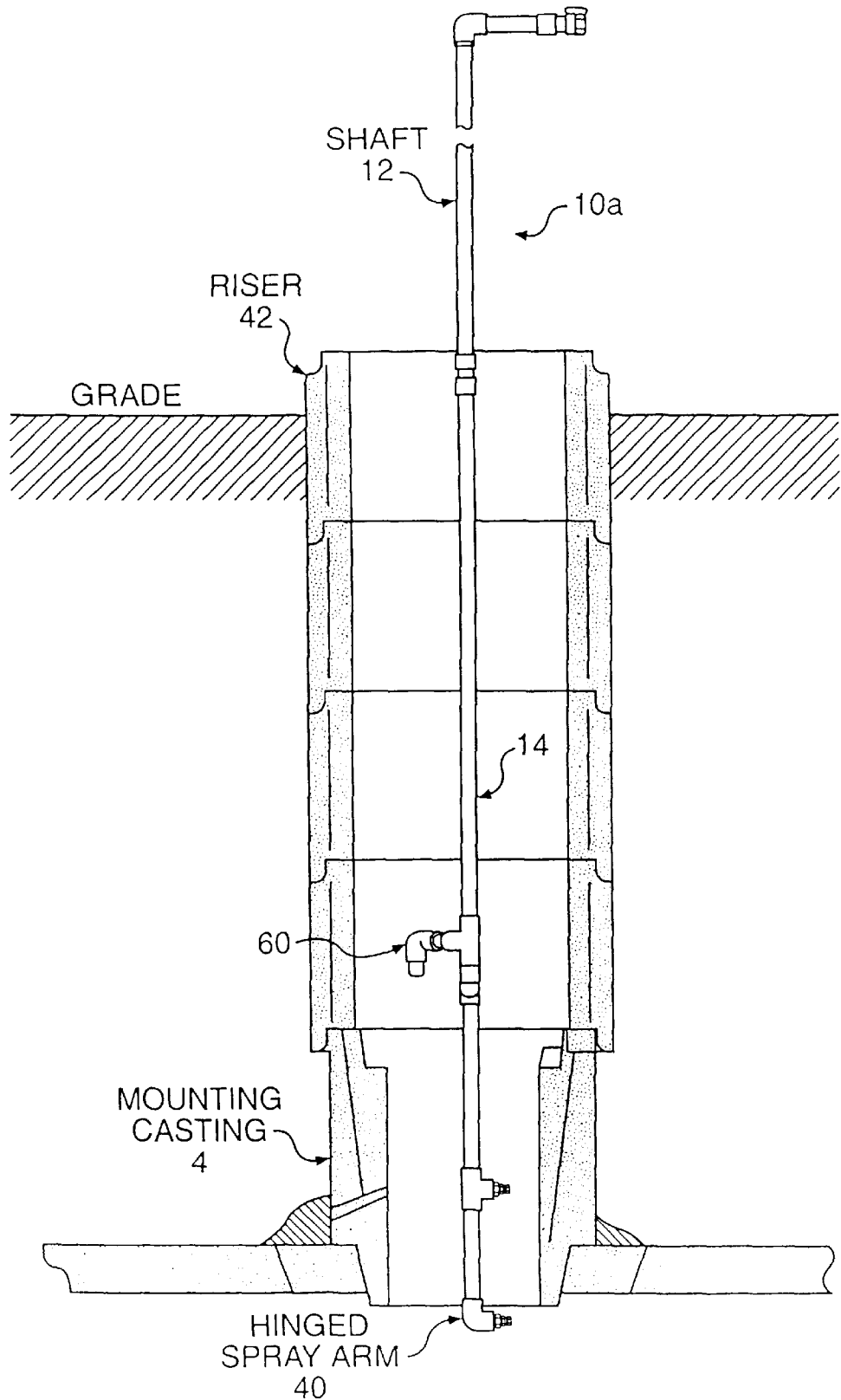
FIG. 9b shows a hinged diffuser support media cleaning tool inserted through risers and a mounting casting.

FIGS. 9a and 9b depict alternate embodiments wherein hinged diffuser 40 allows water to pass through plurality of nozzles 24.

Figure 10A:
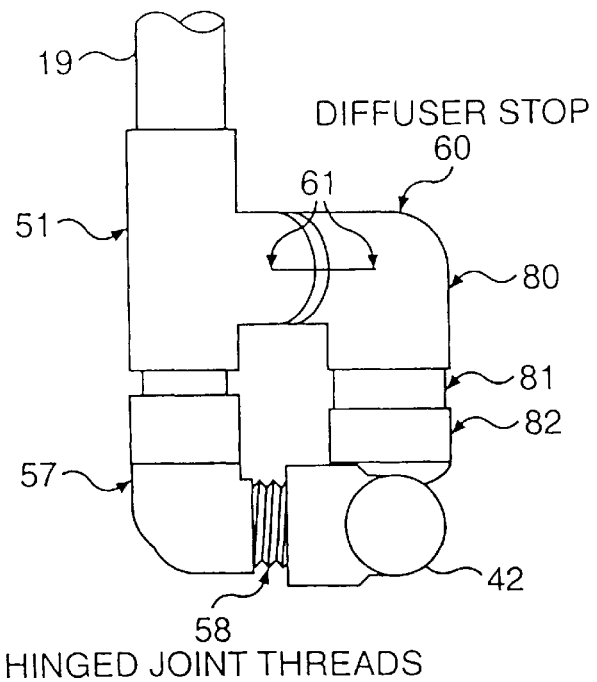
FIG. 10a shows a hinged diffuser support media cleaning tool.
Figure 10B:
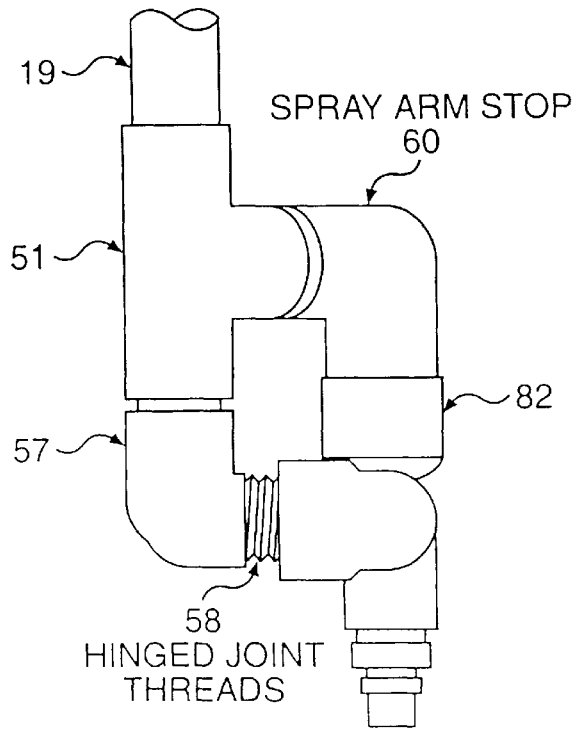
FIG. 10b shows a partial view of a hinged diffuser support media cleaning tool with a diffuser stop and hinged joint threads.

FIGS. 10a and 10b show a hinged diffuser mechanism. The hinged diffuser mechanism comprises a hinged section and diffuser stop (or sprayer arm stop) 60. The hinged section comprises first tee connector 51 attached at its upper vertical leg to extension shaft 19. Attached to the lower vertical leg of the tee connector is elbow 57. At the distal end of the elbow are hinged joint threads 58. In the preferred embodiment, the hinged joint threads are modified to straight threads to ensure a free swinging hinge (even with a generous thread engagement for strength and durability). The hinged diffuser comprises a plurality of orifices or nozzles as described in detail above. Other hinged mechanisms such as cam mechanisms or engaging inclined facing mechanisms are also contemplated.

Diffuser stop 60 comprises threaded elbow 80 coupled to the horizontal leg of tee joint 51. Depending downward from the distal end of elbow 80 is pipe 81 having cap 82 on its distal end. To insure proper alignment with hinged diffuser 40, diffuser stop 60 is screwed into tee joint 51 until diffuser stop 60 is snug, and lines 61 on tee joint 51 and diffuiser stop 60 are aligned.

Figure 11A:
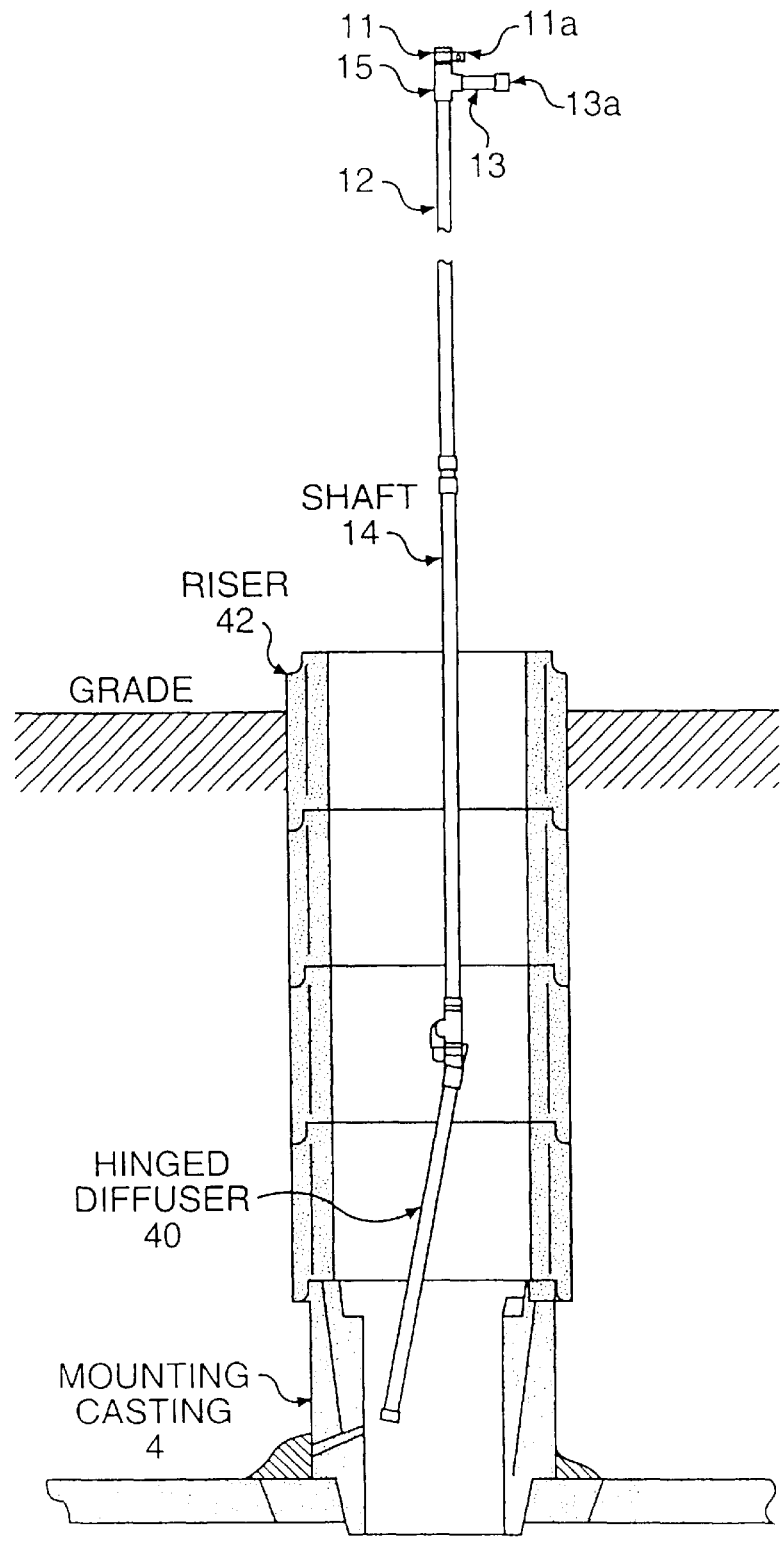
FIG. 11a shows a hinged diffuser support media cleaning tool inserted through several risers and a mounting casting.
Figure 11B:
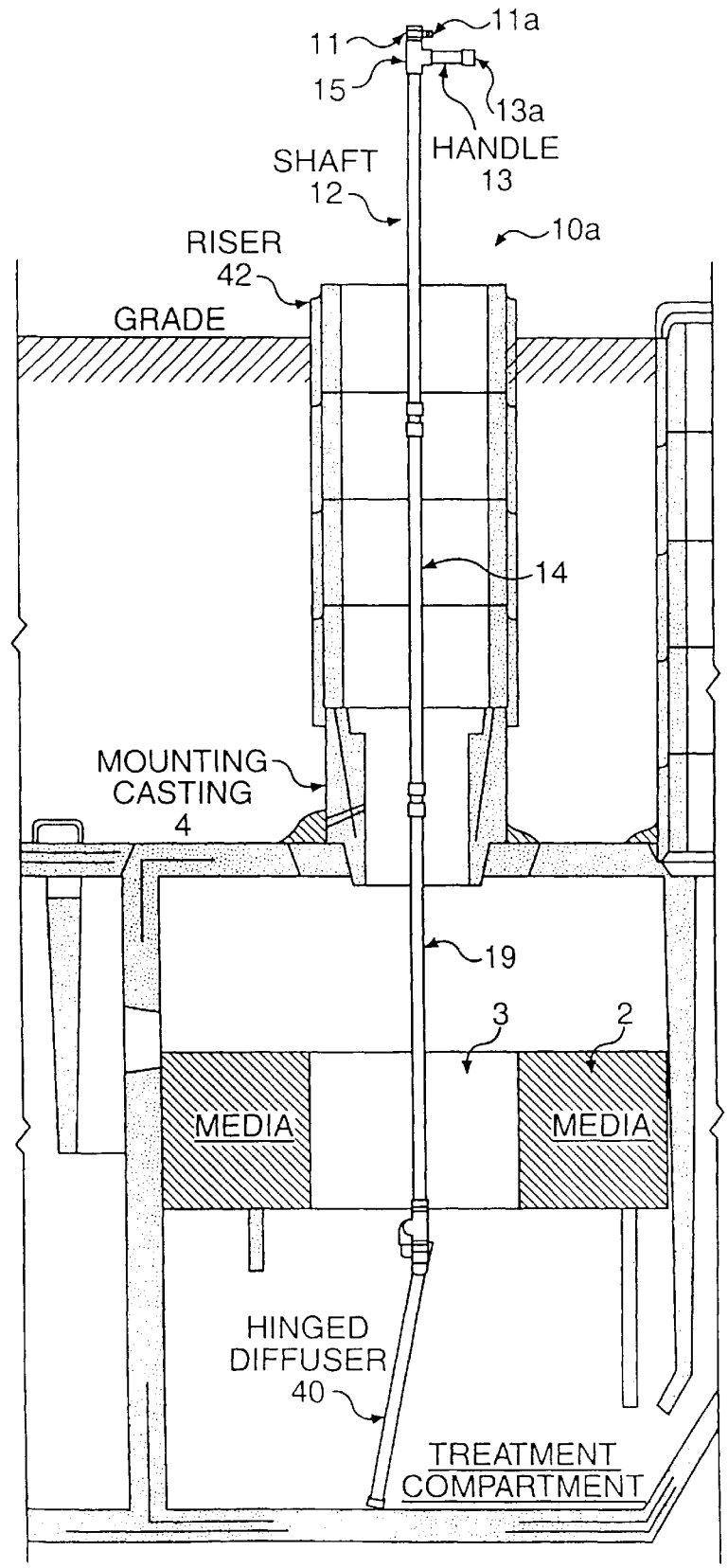
FIG. 11b shows a hinged diffuser support media cleaning tool in a wastewater treatment tank with the diffuser below the support media.

FIGS. 11a and 11b show that, prior to compressed air or water being forced through the hinged diffuser support media cleaning tool, hinged diffuser 40 is retained in a downward position at a slight angle with respect to shaft 14, and the diffuser stop prevents the hinged diffuser from turning in the wrong direction when air or water is forced through the hinged diffuser.

As shown, the hinged diffuser media cleaning tool with hinged diffuser 40 is inserted into a treatment tank through multiple risers 42 and mounting casting 4. The hinged diffuser is at a slight angle with respect to the shaft, which permits the hinged diffuser support media cleaning tool to pass through multiple risers en route to the lower portion of the treatment tank. Utilizing the hinged diffuser support media tool of the present invention, an operator is able to clean virtually any treatment tank, regardless of the number of risers utilized or the distance below grade the treatment tank is located.

Figure 12:
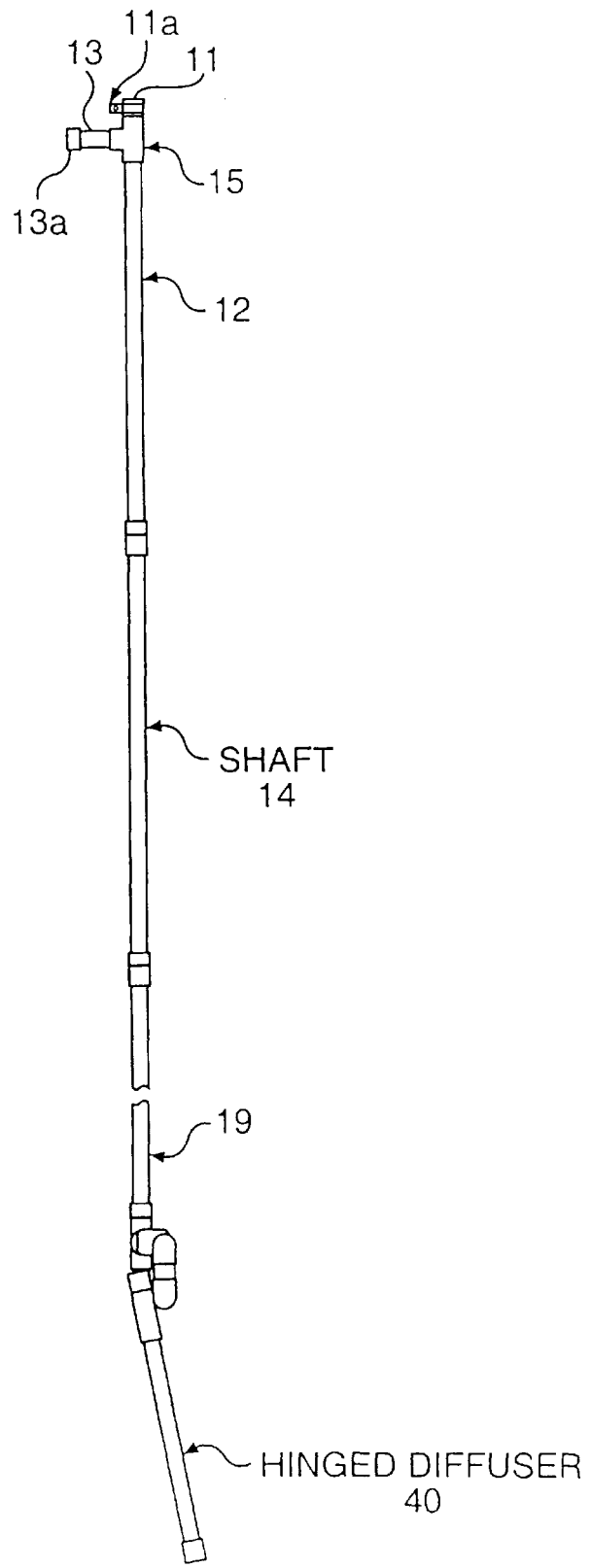
FIG. 12 shows a hinged diffuser support media cleaning tool with the diffuser hanging downward.

FIG. 12 shows hinged diffuser 40 in a downward position at a slight angle with respect to shaft 14.

Figure 13A:
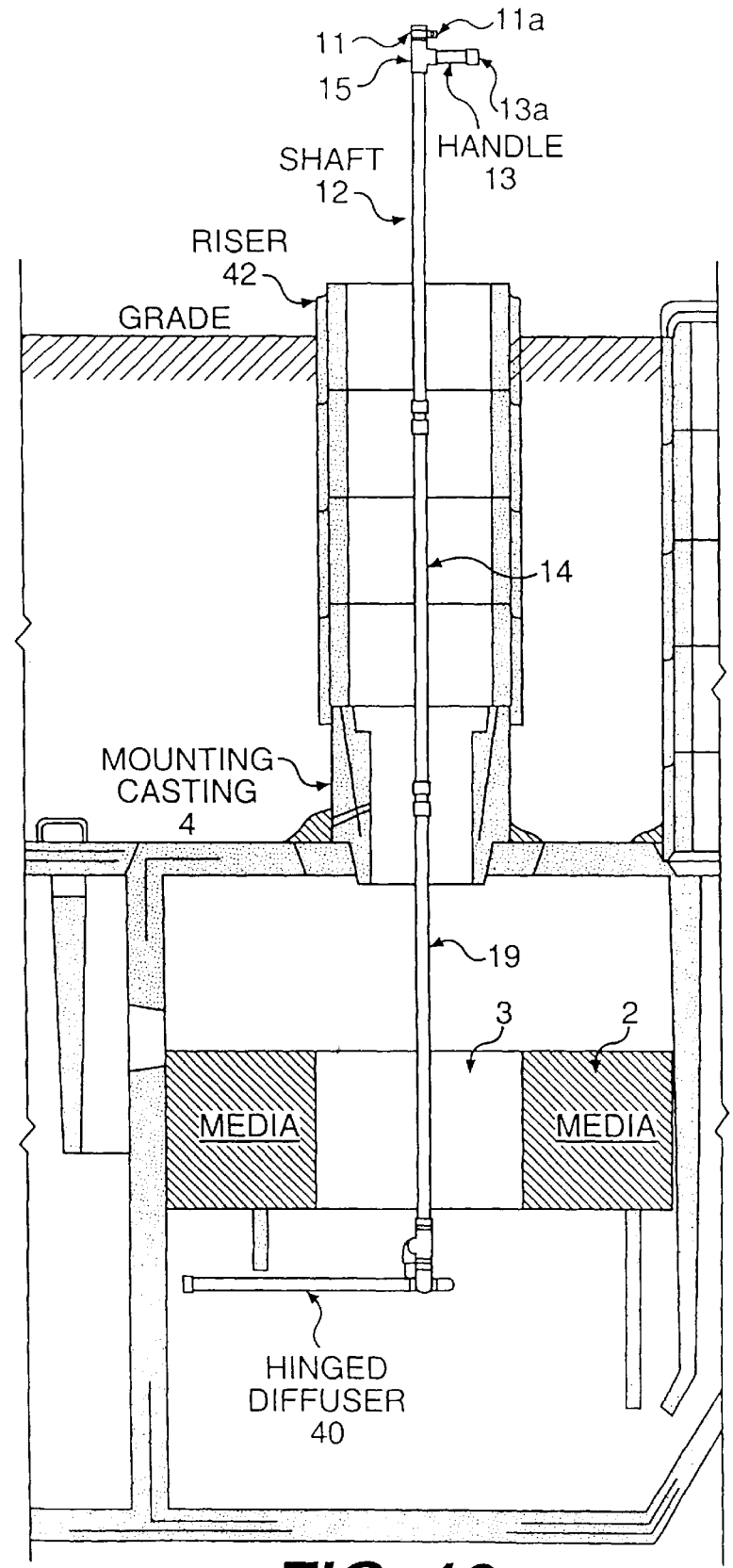
FIG. 13a shows a hinged diffuser support media cleaning tool in a wastewater treatment tank with the diffuser below the support media.
Figure 13B:
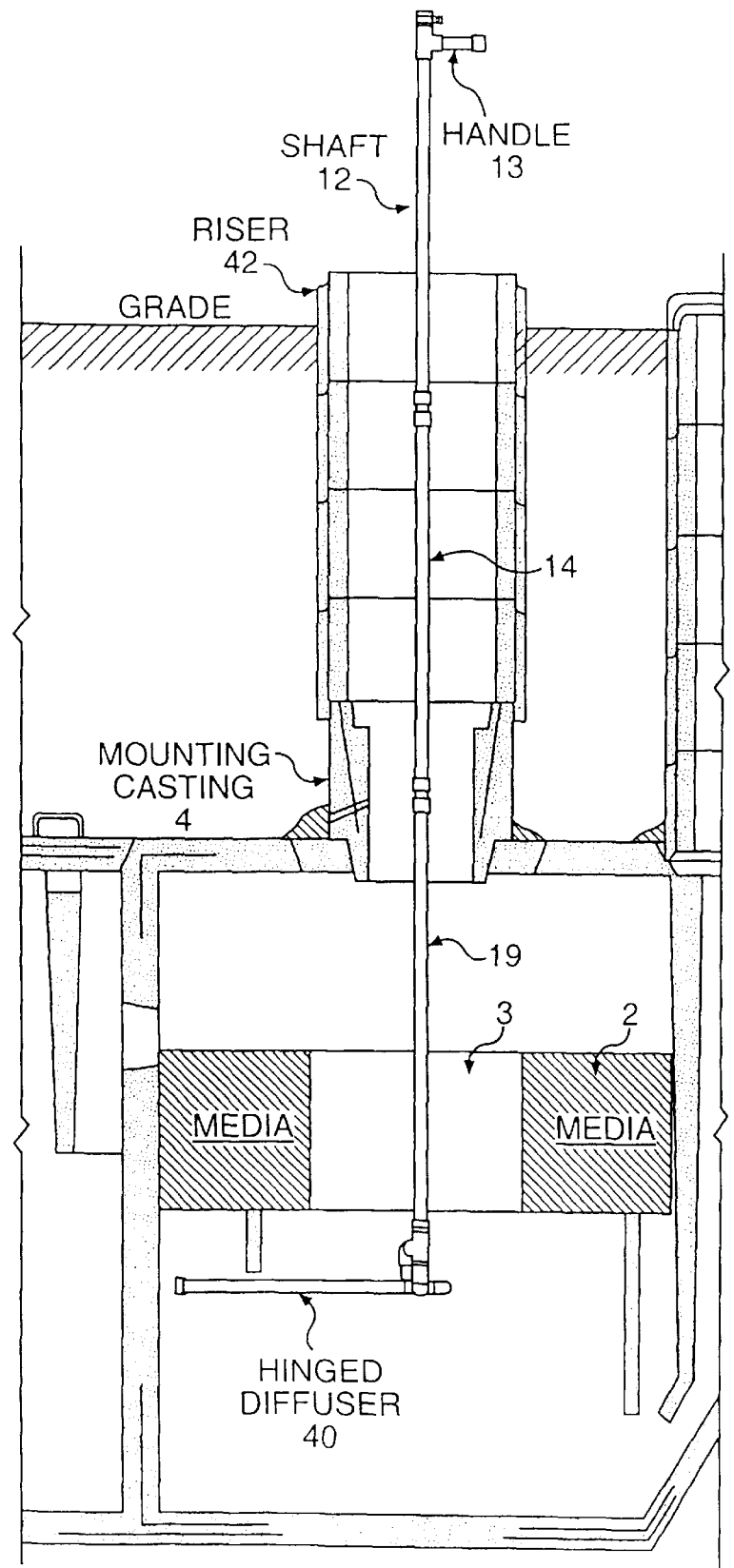
FIG. 13b shows a hinged diffuser support media cleaning tool in a cleaning position with the tip of the diffuser touching a wall of the wastewater treatment tank.
Figure 13C:
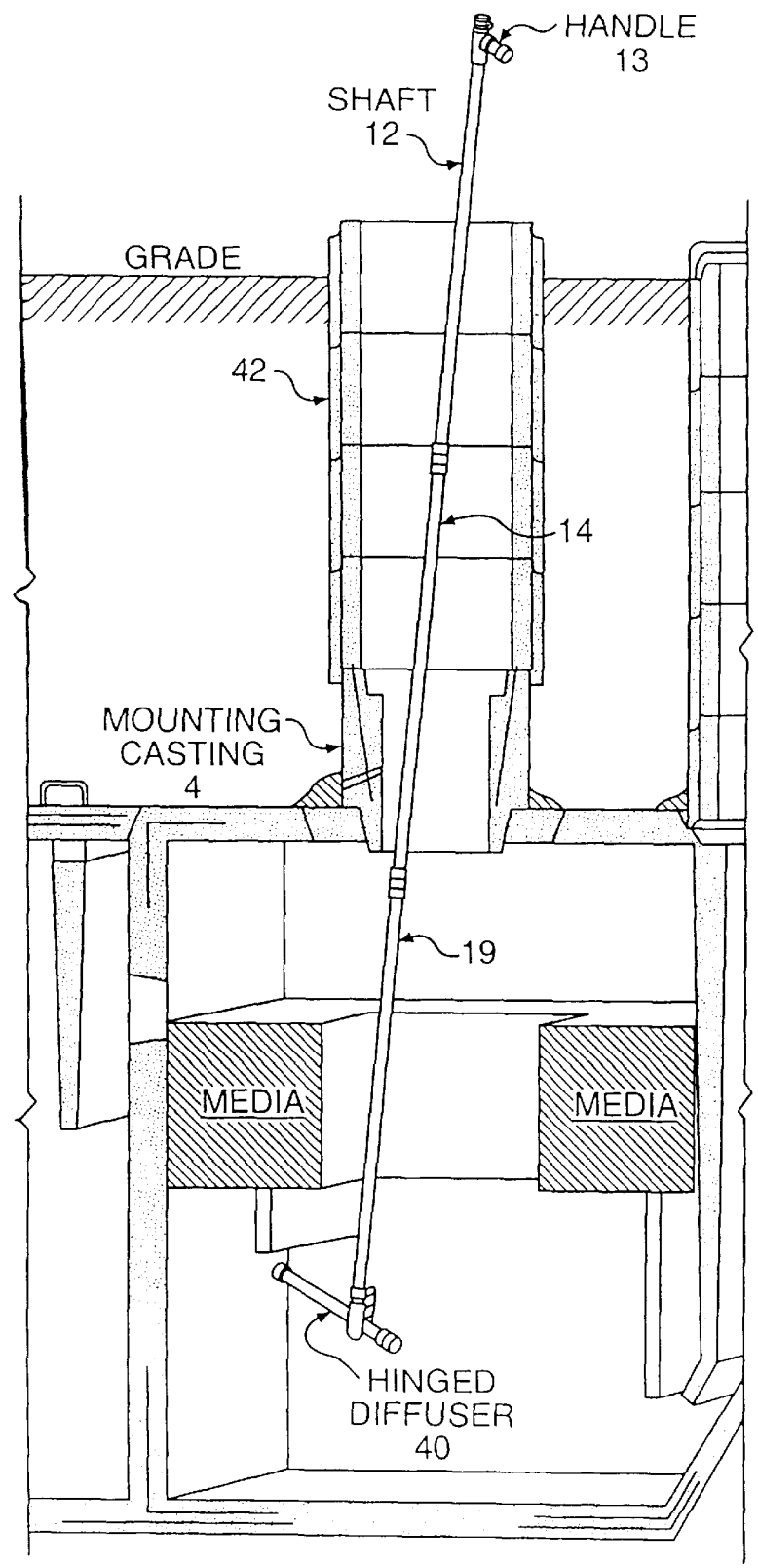
FIG. 13c shows a hinged diffuser support media cleaning tool in a cleaning position with the tip of the diffuser in a corner of the wastewater treatment tank.
Figure 13D:
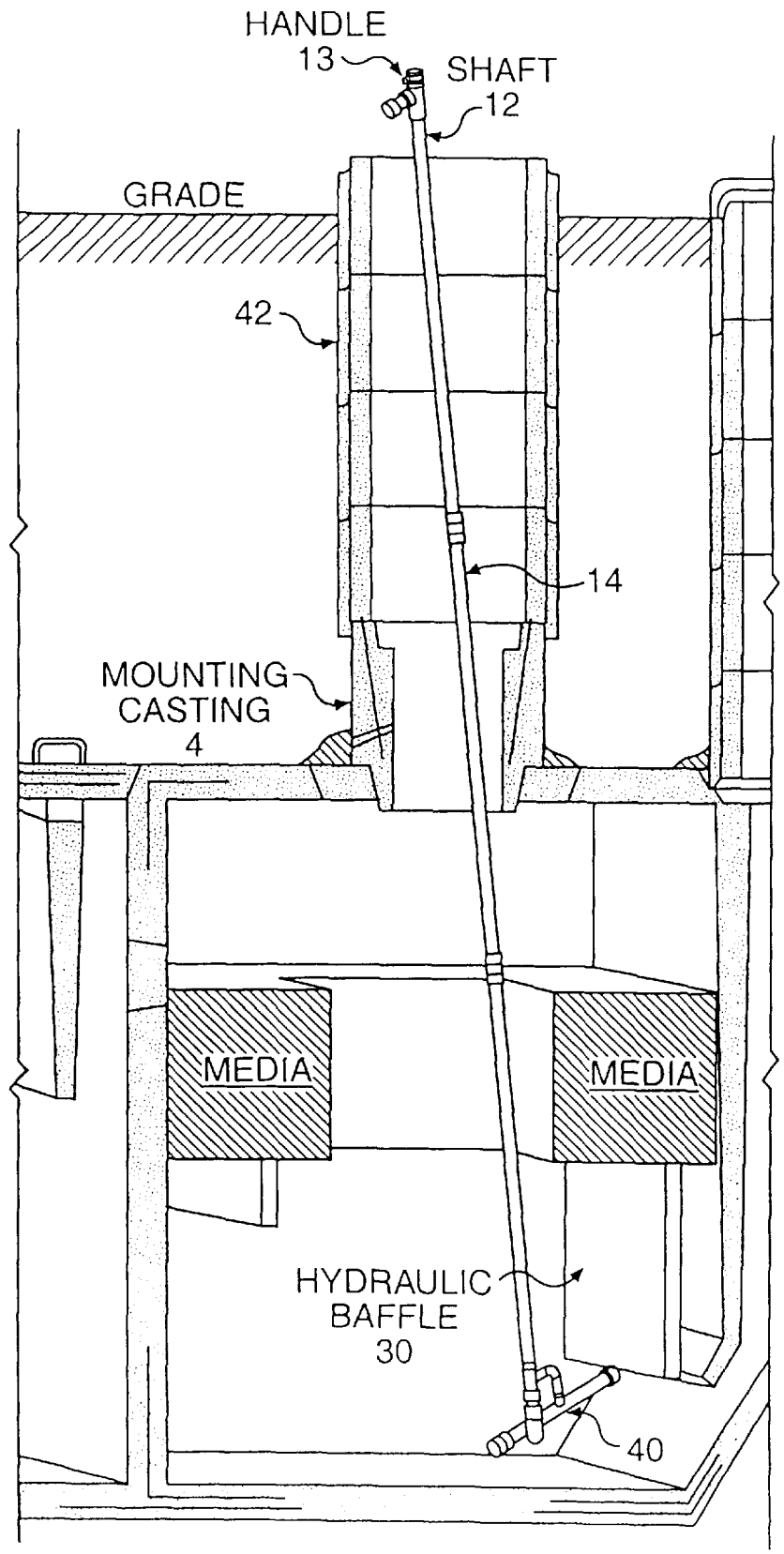
FIG. 13d shows a hinged diffuser support media cleaning tool in a cleaning position with the tip of the diffuser in a corner of a wastewater treatment tank and beneath a hydraulic baffle.

FIGS. 13a–13d show the hinged diffuser support media cleaning tool, wherein hinged diffuser 40 is at various positions within treatment tanks. FIG. 13a shows the hinged diffuser support media cleaning tool in a cleaning position beneath blocks of BAT media support 2, such as would be used for cleaning by the use of compressed air. FIG. 13b shows the hinged diffuser support media cleaning tool in a cleaning position beneath blocks of BAT media support, wherein the diffuser tip is touching a wall of the treatment tank and in position for cleaning by the use of compressed air. As shown in FIG. 13b, the hinged diffuser is able to span the entire length of the treatment tank to ensure complete "coverage" during cleaning of the blocks of BAT media support. FIG. 13c shows the hinged diffuser support media cleaning tool in a cleaning position (for use of compressed air) beneath blocks of BAT media support, wherein the hinged diffuser is in the corner of a treatment tank. FIG. 13d shows the hinged diffuser support media cleaning tool in a cleaning position (for use of compressed air) beneath the blocks of BAT support media, wherein the diffuser tip is positioned in the corner of a treatment tank and beneath hydraulic baffle 30. FIGS. 13c and 13d demonstrate a proper length for shaft 12 so that the hinged diffuser can be manipulated optimally from above the ground when it is in an appropriate cleaning position (for use of compressed air) beneath the blocks of BAT support media.

Figure 14A:
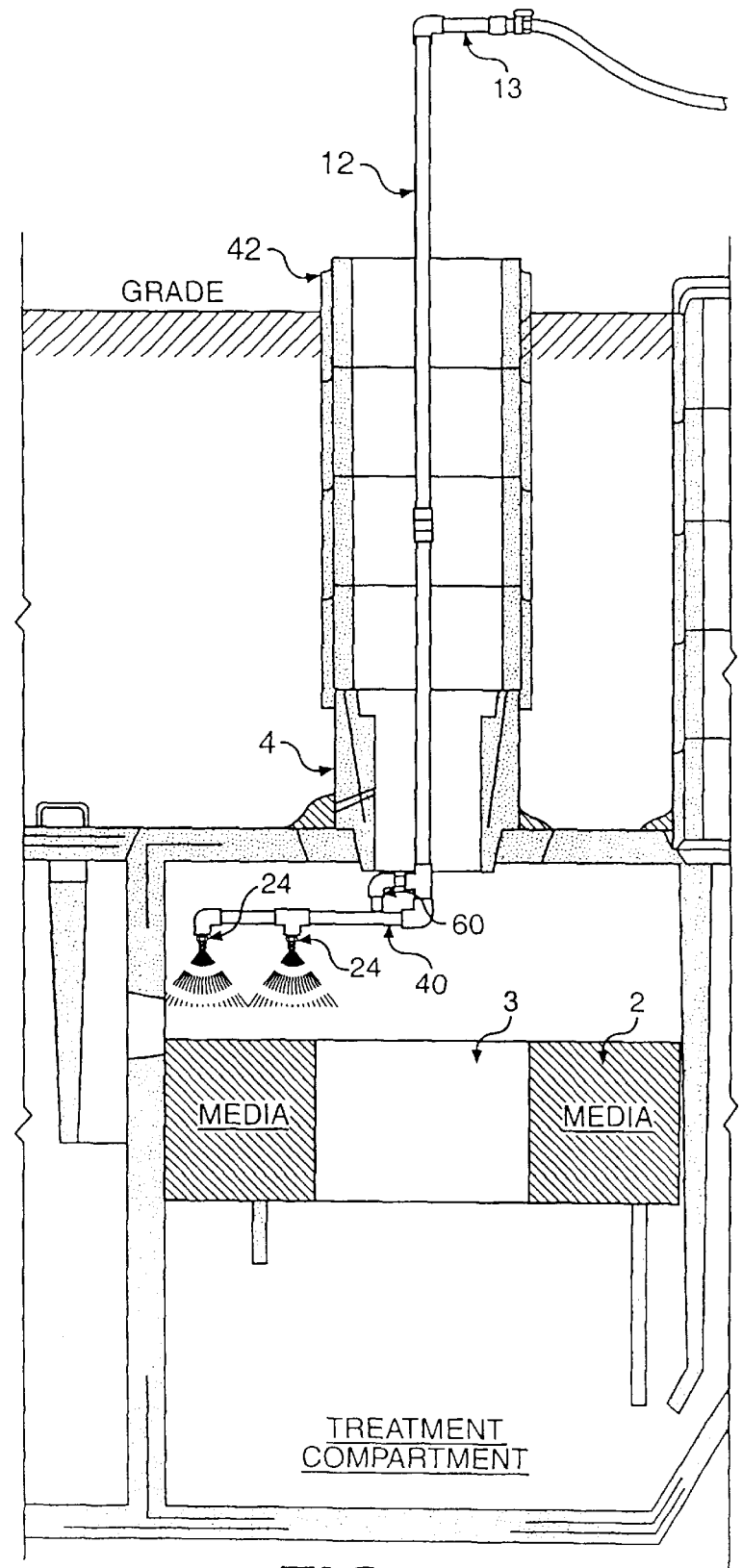
FIG. 14a shows a hinged diffuser support media cleaning tool in a wastewater treatment tank with the diffuser above blocks of support media after the water is turned "on."

FIG. 14a shows the hinged diffuser positioned above blocks of BAT support media, as would be appropriate for cleaning by the use of pressurized water.

When utilizing the hinged diffuser media cleaning tool for cleaning with pressurized water, the operator first pumps the waste water from the treatment tank so that the blocks of BAT support media are no longer submerged. Hinged diffuser 40, with nozzles facing downward, is inserted via the risers in the manner described above, and then placed above the blocks of BAT support media 2. Once this is accomplished, high pressure water is supplied through the hinged diffuser media cleaning tool until it reaches the hinged diffuser. The high pressure water flows through the nozzles and forces the diffuser tip to swing up to a right-angle operating position (relative to the shaft) above the blocks of BAT support media. The cleaning action is generated from the force of the water on the surfaces of the fixed BAT support media. The operator then moves the hinged diffuser support media cleaning tool slowly around the tank above the blocks of BAT support media, cleaning the entire support media structure. During the water cleaning operation, the top of shaft 12 and handle 13 are above ground. Once the water is "turned off," the hinged diffuser automatically re-positions itself at a slight angle with respect to shaft 14, thereby allowing the operator to remove the hinged diffuser from the treatment tank. The diffuser stop prevents the hinged diffuser from extending past the slight angle with respect to the shaft.

Figure 15:
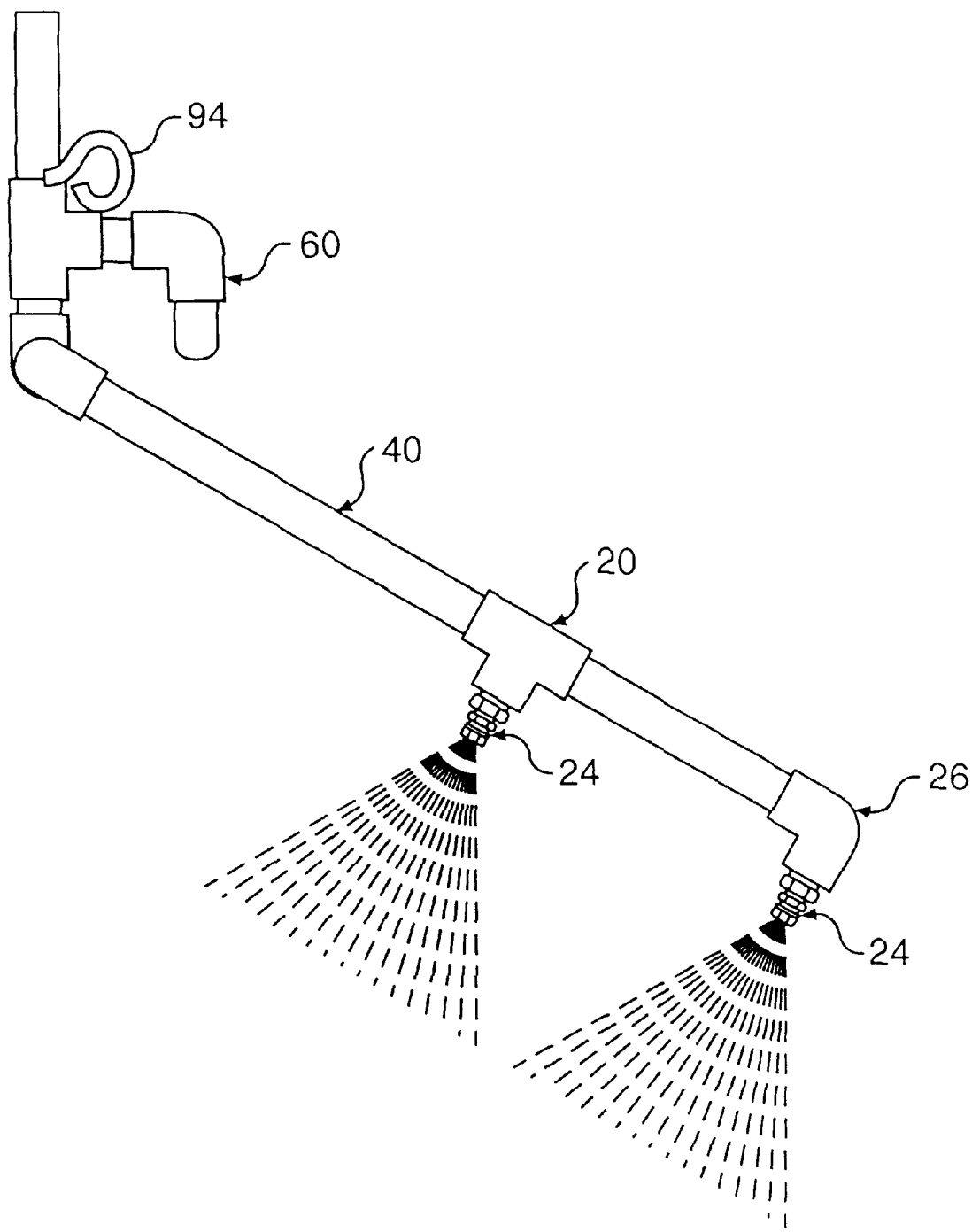
FIG. 15 shows a hinged diffuser support media cleaning tool in an improper position due to low water pressure.

FIG. 15 shows a hinged diffuser support media cleaning tool in an improper position due to low water pressure. Water pressure that is too low will not raise hinged diffuser 40 sufficiently to contact diffuser stop 60. For situations in which the water pressure is too low, a spray arm adjustment cord (or diffuser adjustment cord) can be utilized.

Figure 16:
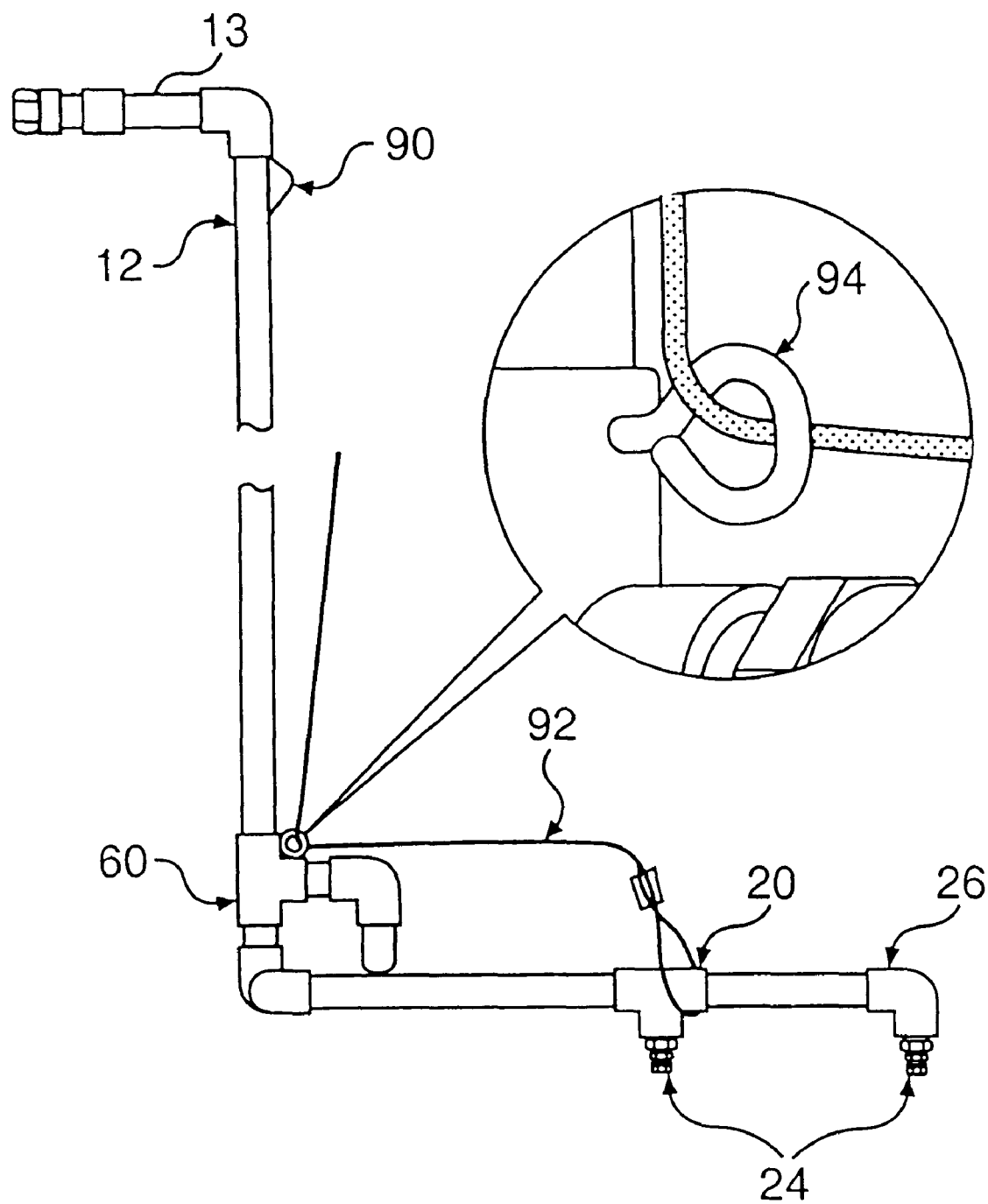
FIG. 16 shows a hinged diffuser support media cleaning tool with a spray arm adjustment cord.
Figure 17:
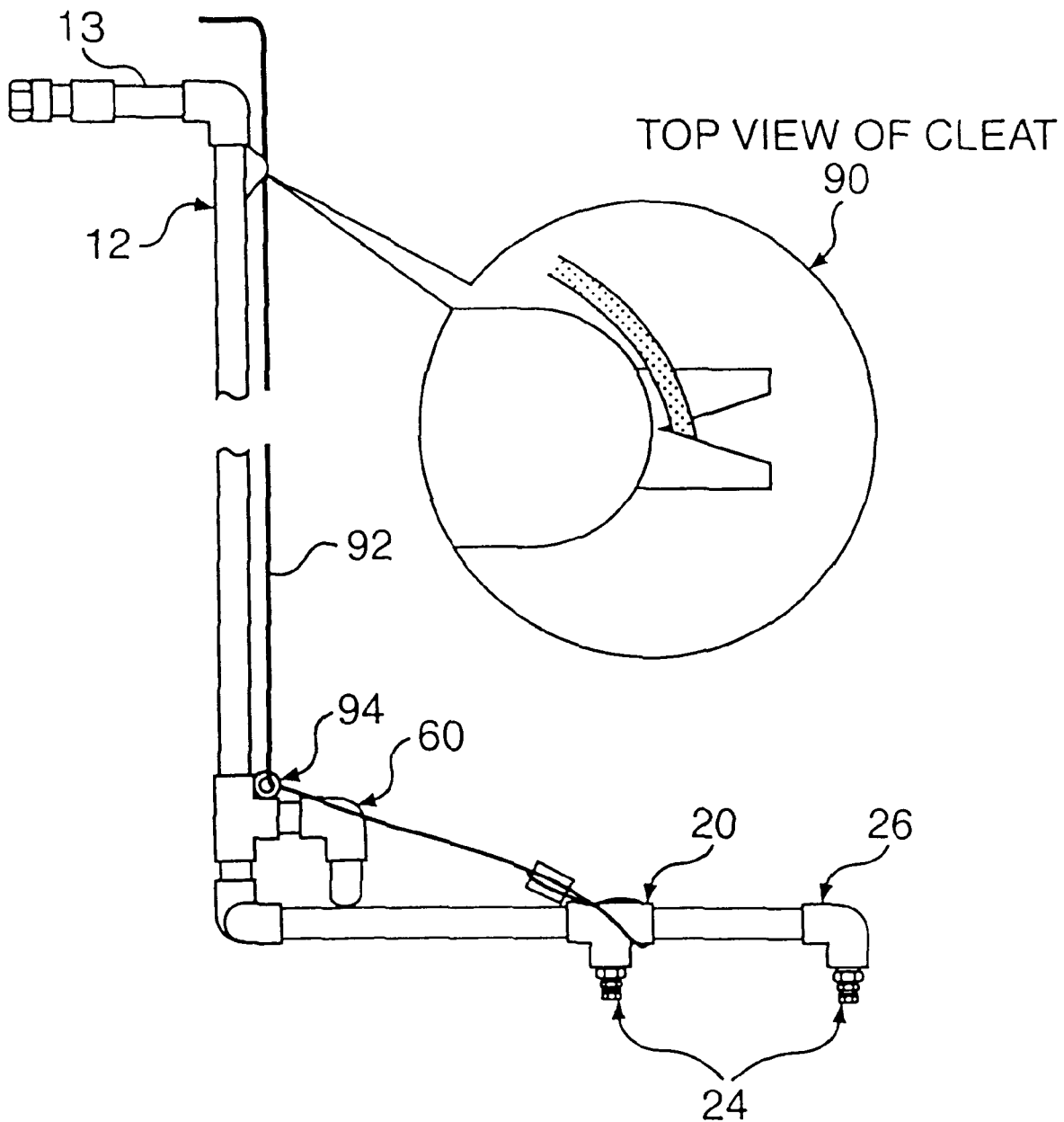
FIG. 17 shows a hinged diffuser support media cleaning tool with a spray arm adjustment cord.

FIGS. 16 and 17 show a hinged diffuser support media cleaning tool with a spray arm adjustment cord. In this embodiment, the spray arm adjustment cord is attached to cleat 90 located on shaft 12. Screwed into the tee connector to which the diffuiser stop is attached is a positioner such as eye screw 94. The spray arm adjustment cord is threaded through the eye of the eye screw, and is looped around the hinged diffuser or attached thereto by any conventional means. In the case of inadequate water pressure, the operator simply pulls the spray arm adjustment cord, which in turn raises the hinged diffuser to the proper position. The operator then may secure the spray arm adjustment cord to cleat 90, thereby keeping the spray arm adjustment cord, and hence the diffuser, in a proper cleaning position. The diffuser shown in FIGS. 17 and 18 has nozzles for cleaning by the use of pressurized water; however, the use of a spray arm adjustment cord is also contemplated for hinged diffusers with orifices for delivery of compressed air.

Figure 18:
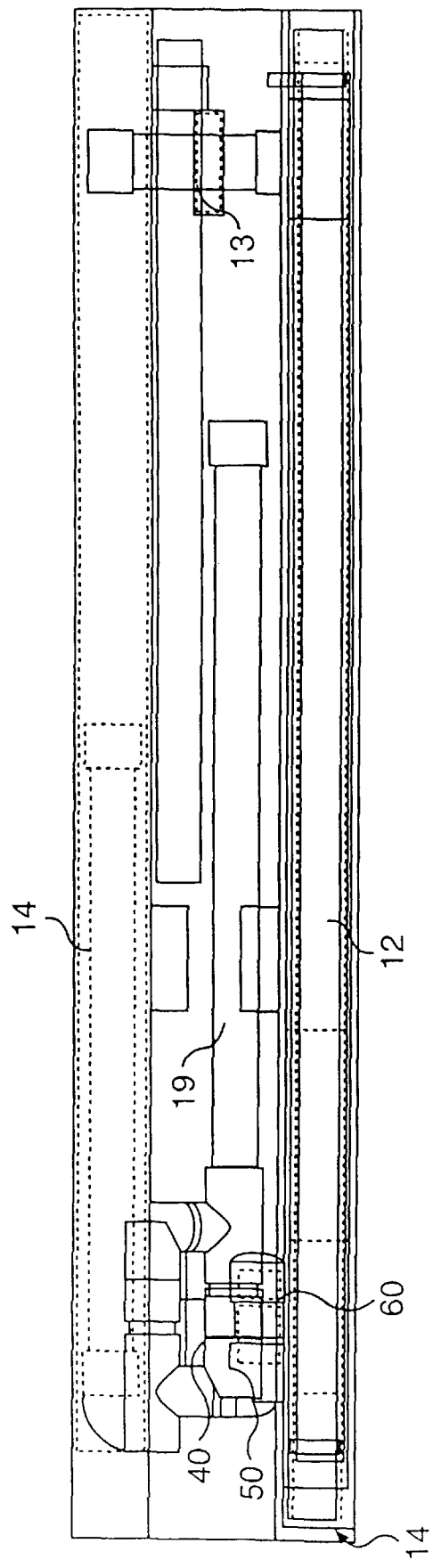
FIG. 18 shows a "packaged" hinged diffuser support media cleaning tool.

FIG. 18 shows a hinged diffuser support media cleaning tool in a disassembled form, such as might be used for packaging and/or storage. Hinged diffuser 40 sits between hollow shafts 12 and 14. Extension shaft 19 is placed between hollow shaft 12 and hinged diffuser 40. Diffuser stopper 60 and hinged portion 50 are located at opposite ends from handle 13. This configuration permits the hinged diffuser support media cleaning tool to be packaged compactly. The fixed diffuser support media cleaning tool can also be packaged in a similar fashion; that is, the fixed diffuser may sit between hollow shafts 12 and 14, and extension shaft 19 may be placed between the fixed diffuser and hollow shaft 12. Both of the above configurations accommodate a diffuser having nozzles or orifices.

In practice, in order to clean the blocks of BAT support media in a treatment tank with the fixed diffuser support media cleaning tool using air (and having orifices instead of nozzles), the operator positions the fixed diffuser support media cleaning tool through the ground level access opening, and then through the mounting casting, as described above. Thereafter, the operator positions the diffuser tip of the diffuser support media cleaning tool through the support media access opening until it is below the blocks of BAT support media. Once this is accomplished, compressed air is supplied through the fixed diffuser support media cleaning tool until is reaches the fixed diffuser, from which the compressed air flows through the plurality of orifices located on the fixed diffuser. The air escaping from the fixed diffuser creates bubbles that rise through the aqueous fluid in the treatment plant, and thereby produces a vigorous boiling action that cleans the surfaces of the blocks of BAT support media above the diffuser. The operator then moves the fixed diffuser support media cleaning tool slowly around the tank beneath the blocks of BAT support media, and thus cleans the entire BAT support media structure. During this kind of air cleaning operation, the fixed diffuser reflects an embodiment wherein the fixed diffuser is at an approximately right angle to the shaft. Additionally, the top of the shaft and the handle are above ground.

When utilizing the diffuser support media cleaning tool with a fixed diffuser and nozzles for cleaning by using water, the operator first pumps the aqueous fluid from the treatment tank so that the blocks of BAT support media are no longer submerged. The fixed diffuser is then placed above the blocks of support media. In this case, the operator once again positions the fixed diffuser support media cleaning tool through the ground level access opening, and then through the bore of the mounting casting. Thereafter, the operator positions the diffuser tip above the BAT support media. Once this is accomplished, high pressure water is supplied through the fixed diffuser support media cleaning tool until it reaches the fixed diffuser. At this point, the high pressure water flows through the bushings and the nozzles to begin the process of cleaning the surfaces of the BAT support media. The support media cleaning action is generated from the force of the water on the surfaces of the fixed BAT support media. The operator then moves the diffuser support media cleaning tool slowly around the tank above the BAT support media, and thus cleans the entire support media structure. During the water cleaning operation, the fixed diffuser is at approximately a right angle with relation to the shaft, and the top of the shaft and the handle are above ground.

In order to clean the BAT support media in a treatment tank by using a hinged diffuser (having orifices for air passage), the operator passes the hinged diffuser (which is at a slight angle a with respect to the shaft) through the ground level access opening, and then through several risers and the mounting casting. Thereafter, the operator is able to pass the diffuiser tip of the hinged diffuser through the media access opening until it is below the blocks of BAT support media. Once this is accomplished, compressed air, or any suitable gas, is supplied through the hinged diffuser support media cleaning tool until it reaches the hinged diffuser, at which point the compressed air flows through the plurality of orifices located on the hinged diffuser. When the hinged diffuser is filled with air, buoyant and thrust forces are created. The thrust force, created by the exit of air from the orifices of the hinged diffuser, propels the hinged diffuser to swing on its hinge to a position that is substantially perpendicular to the shaft. The diffuser stop prevents the hinged diffuser from extending past a substantially perpendicular position with relation to the shaft. The air exiting the diffuser creates bubbles that rise through the water and, in turn, thereby produces a vigorous boiling action that cleans the surfaces of the blocks of BAT support media. The operator then moves the diffuser support media cleaning tool slowly around the tank beneath the blocks of BAT support media, (as was previously shown in FIGS. 13a–13d), to clean the entire BAT support media structure. During the air cleaning operation, the hinged diffuser is at an approximately right angle with relation to the shaft, while the top of the shaft and the handle are above the ground. When the air is "turned off," the hinged diffuser automatically re-positions itself at a slight angle with respect to the shaft, thereby allowing the operator to remove the hinged diffuser from the treatment tank. The diffuser stop prevents the hinged diffuser from extending past the slight angle with respect to the shaft.

To work effectively, the hinged diffuser must swing freely on the hinged joint threads and allow compressed air or water to pass freely from the shaft to the diffuser. In order for the hinged diffuser to swing freely, the hinged joint threads must be periodically cleaned and lubricated. In one embodiment, the hinged joint threads are cleaned and lubricated as follows: (1) removing the diffuser stop; (2) removing the diffuser; (3) cleaning and washing the hinged joint threads; (4) lubricating the hinged joint threads with spray lubricant such as silicone or teflon; and (5) reassembling and checking that the diffuser now swings freely.

Preferred and alternate embodiments of the present invention have now been described in detail. It is to be noted, however, that these embodiments are merely illustrative of the principles underlying the inventive concept of the present invention. It is therefore contemplated that various modifications of the disclosed embodiments will be apparent to persons of ordinary skill in the art, without departing from the scope of the present invention. For example, gases other than air, as well as fluids other than water, may be employed to effect cleaning by the apparatus and method of the present invention.

What is claimed is:

1. A Biologically Accelerated Treatment (BAT) support media cleaning tool comprising:

a hollow shaft comprising an upper end and a lower end, the lower end comprising a distal end;

a tee joint comprising a first end, a second end, and a perpendicular t-section, the first end being attached to the upper end of the hollow shaft;

a handle comprising the perpendicular t-section of the tee joint, and further comprising a cap attached thereto; and a diffuser attached substantially perpendicular to the distal end of the lower end of the hollow shaft, the diffuser comprising a topside, a bottom side, a proximal end, a distal end, and a plurality of orifices placed along its lengths wherein said hollow shaft and said diffuser are configured for insertion through an opening in said BAT support media.

2. The BAT support media cleaning tool of claim 1, wherein each orifice further comprises a nozzle, each nozzle being attached to a downward facing reducing tee joint comprising a first end, a second end, and a perpendicular t-section, wherein the first and second ends of the reducing tee joint are coupled to the diffuser and the nozzle is attached to the perpendicular t-section.

3. The BAT support media cleaning tool of claim 2, wherein the diffuser further comprises an orifice at its distal end, and wherein the orifice comprises a downward facing reducing elbow to which a nozzle is attached.

4. The BAT support media cleaning tool of claim 3, further comprising a bushing placed between the nozzle and the reducing elbow.

5. The BAT support media cleaning tool of claim 2, further comprising a bushing placed between the nozzle and the perpendicular t-section of the reducing tee joint.

6. The BAT support media cleaning tool of claim 1, further comprising a hose attachment clamp attached about the second end of the tee joint, and a hose attached to the second end of the tee joint using the hose attachment clamp.

7. The BAT support media cleaning tool of claim 6, further comprising a flow control valve between the hose and the second end of the tee joint.

8. The BAT support media cleaning tool of claim 1, further comprising a hose attachment clamp attached about the perpendicular t-section of the tee joint, and a hose attached to the perpendicular t-section of the tee joint with the hose attachment clamp.

9. The BAT support media cleaning tool of claim 7, further comprising a flow control valve between the hose and the perpendicular t-section of the tee joint.

10. The BAT support media cleaning tool of claim 1, wherein the hollow shaft further comprises a plurality of hollow shafts connected end-to-end.

11. The BAT support media cleaning tool of claim 1, wherein the proximal end of the diffuser is attached to the hollow shaft by means of a right angle elbow joint.

12. The BAT support media cleaning tool of claim 1, wherein the tool is designed to clean by the passage of air through the diffuser, and the diffuser's orifices are positioned on the topside of the diffuser.

13. The BAT support media cleaning tool of claim 1, wherein the tool is designed to clean by the passage of water through the diffuser, and the diffuser's orifices comprise nozzles, the nozzles being positioned on the bottom side of the diffuser.

14. The BAT support media cleaning tool of claim 1, wherein the proximal end of the diffuser is attached to the distal end of the lower end of the hollow shaft by a hinge so that the diffuser can pivot.

15. The BAT support media cleaning tool of claim 14, wherein the hinge comprises:
   a tee joint comprising a first vertical leg, a second vertical leg, and a perpendicular leg, wherein the first vertical leg is attached to the distal end of the lower end of the hollow shaft;
   an elbow joint attached to the second vertical leg of the tee joint and with hinged joint threads at its distal end; and
   a diffuser stop coupled to the perpendicular leg of the tee joint.

16. The BAT support media cleaning tool of claim 15, wherein the diffuser stop comprises
   a vertically oriented pipe with an upper end, a lower end, and a cap connected to the lower end; and
   an elbow joint with a first threaded end portion and a second threaded end portion, the first threaded end portion being screwed into the perpendicular leg of the tee joint, and the second threaded end portion being screwed into the upper end of the vertically oriented pipe.

17. The BAT support media cleaning tool of claim 14, further comprising a diffuser adjustment cord attached to a cleat located on the hollow shaft, passed through a positioner placed proximate to the tee joint of the hinge, and coupled to the distal end of the diffuser, so that the angle of the diffuser relative to the hollow shaft can be manually adjusted.

18. The BAT support media cleaning tool of claim 14, wherein the hinge automatically pivots due to the passage of air through the cleaning tool.

19. The BAT support media cleaning tool of claim 14, wherein the hinge automatically pivots due to the passage of water through the cleaning tool.

20. A cleaning tool comprising:
   a hollow shaft comprising an upper end and a lower end, the lower end comprising a distal end;
   a tee joint comprising a first end, a second end, and a perpendicular t-section, the first end being attached to the upper end of the hollow shaft;
   a handle comprising the perpendicular t-section of the tee joint, and a cap coupled thereto;
   a hinge comprising
      a tee joint comprising a first vertical leg, a second vertical leg, and a perpendicular leg, wherein the first vertical leg is attached to the distal end of the lower end of the hollow shaft, an elbow joint attached to the second vertical leg of the tee joint and with hinged joint threads at its distal end, and
      a diffuser stop coupled to the perpendicular leg of the tee joint; and
   a diffuser coupled to the hinged joint threads at the distal end of the elbow joint of the hinge, the diffuser comprising a topside, a bottom side, a proximal end, a distal end, and a plurality of orifices placed along its length.

21. The cleaning tool of claim 20, wherein the diffuser stop comprises:
   a vertically oriented pipe with an upper end, a lower end, and a cap connected to the lower end; and
   an elbow joint with a first threaded end portion and a second threaded end portion, the first threaded end portion being screwed into the perpendicular leg of the tee joint, and the second threaded end portion being screwed into the upper end of the vertically oriented pipe.

22. The cleaning tool of claim 20, further comprising a diffuser adjustment cord attached to a cleat located on the hollow shaft, passed through a positioner placed proximate to the tee joint of the hinge, and coupled to the distal end of the diffliser, so that the angle of the diffuser relative to the hollow shaft can be manually adjusted.

23. The cleaning tool of claim 20, wherein the hollow shaft further comprises a plurality of hollow shafts connected end-to-end.

24. The cleaning tool of claim 20, wherein each orifice further comprises a nozzle, each nozzle being attached to a downward facing reducing tee joint comprising a first end, a second end, and a perpendicular t-section, wherein the first and second ends of the reducing tee joint are coupled to the diffuser and the nozzle is attached to the perpendicular t-section.

25. The cleaning tool of claim 24, further comprising a bushing placed between the nozzle and the perpendicular t-section of the reducing tee joint.

26. The cleaning tool of claim 20, wherein the diffuser further comprises an orifice at its distal end, and the orifice comprises a downward facing reducing elbow to which a nozzle is attached.

27. The cleaning tool of claim 20, further comprising a hose attachment clamp attached about the second end of the tee joint, and a hose attached to the second end of the tee joint with the hose clamp.

28. The cleaning tool of claim 27, further comprising a flow control valve between the hose and the second end of the tee joint.

29. The cleaning tool of claim 20, further comprising a hose attachment clamp attached about the perpendicular t-section of the tee joint, and a hose attached to the perpendicular t-section of the tee joint with the hose attachment clamp.

30. The cleaning tool of claim 29, further comprising a flow control valve between the hose and the perpendicular t-section of the tee joint.

31. A cleaning tool comprising:
   a hollow shaft comprising an upper end and a lower end, the lower end comprising a distal end;
   a tee joint comprising a first end, a second end, and a perpendicular t-section, the first end being attached to the upper end of the hollow shaft;
   a handle comprising the perpendicular t-section of the tee joint, and further comprising a cap attached thereto;
   a hinge comprising
      a tee joint comprising a first vertical leg, a second vertical leg, and a perpendicular leg, wherein the first vertical leg is attached to the distal end of the lower end of the hollow shaft,
      an elbow attached to the second vertical leg of the tee joint and with hinged joint threads at its distal end; and
      a diffuser stop coupled to the perpendicular leg of the tee joint, wherein the diffuser stop comprises
         a vertically oriented pipe with an upper end, a lower end, and a cap connected to the lower end,
         an elbow joint with a first threaded end portion and a second threaded end portion, the first threaded end portion being screwed into the perpendicular leg of the tee join, and the second threaded end portion being screwed into the upper end of the vertically oriented pipe; and a diffuser coupled to the perpendicular leg of the tee joint of the hinge, the diffuser comprising a topside, a bottom side, a proximal end, a distal end, and a plurality of nozzles placed on the bottom side along its length.

32. The cleaning tool of claim 31, wherein a bushing is placed proximate each nozzle.

33. The cleaning tool of claim 31, further comprising a hose attachment clamp attached about the second end of the tee joint, and a hose attached to the second end of the tee joint with the hose attachment clamp.

34. The cleaning tool of claim 31, further comprising a hose attachment clamp attached about the perpendicular t-section of the tee joint, and a hose attached to the perpendicular t-section of the tee joint with the hose attachment clamp.

35. The cleaning tool of claim 33, further comprising a flow control valve between the hose and the second end of the tee joint.

36. The cleaning tool of claim 34, further comprising a flow control valve between the hose and the perpendicular t-section of the tee joint.

37. The cleaning tool of claim 31, wherein the hollow shaft further comprises a plurality of hollow shafts connected end-to-end.

38. The cleaning tool of claim 31, further comprising a diffuser adjustment cord attached to a cleat located on the hollow shaft, passed through a positioner placed proximate to the tee joint of a hinge, and coupled to the distal end of the diffuser, so that the angle of the diffuser relative to the hollow shaft can be manually adjusted.

* * * * *